US009900196B2

(12) United States Patent
Tarighat Mehrabani et al.

(10) Patent No.: US 9,900,196 B2
(45) Date of Patent: Feb. 20, 2018

(54) SWITCHING DIVERSITY IN SCALABLE RADIO FREQUENCY COMMUNICATION SYSTEM

(71) Applicant: BROADCOM CORPORATION, Irvine, CA (US)

(72) Inventors: Alireza Tarighat Mehrabani, Irvine, CA (US); Payam Torab Jahromi, Laguna Niguel, CA (US); Brima Babatunde Ibrahim, Laguna Hills, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/952,882

(22) Filed: Nov. 25, 2015

(65) Prior Publication Data

US 2016/0150591 A1     May 26, 2016

Related U.S. Application Data

(60) Provisional application No. 62/152,759, filed on Apr. 24, 2015, provisional application No. 62/085,011, filed on Nov. 26, 2014.

(51) Int. Cl.
*H04L 27/18*     (2006.01)
*H04W 76/04*     (2009.01)
(Continued)

(52) U.S. Cl.
CPC .......... *H04L 27/18* (2013.01); *H04B 7/0408* (2013.01); *H04W 16/28* (2013.01); *H04W 52/38* (2013.01);
(Continued)

(58) Field of Classification Search
CPC ... H04B 7/0617; H04B 7/0408; H04W 16/28; H04W 56/0005
See application file for complete search history.

(56) References Cited

U.S. PATENT DOCUMENTS 6,633,190 B1 * 10/2003 Alvandpour .............. G06F 1/04
                                                                     327/149
7,974,596 B2     7/2011   Lim et al.
(Continued)

OTHER PUBLICATIONS

Hur, et al., "Millimeter Wave Beamforming for Wireless Backhaul and Access in Small Cell Networks," IEEE Transactions on Communications, Oct. 2013, pp. 4391-4403 vol. 61, No. 10.
(Continued)

*Primary Examiner* — Bobbak Safaipour
(74) *Attorney, Agent, or Firm* — McDermott Will & Emery LLP

(57) ABSTRACT

A system implementing switching diversity in a scalable radio frequency communication system includes a primary radio frequency integrated circuit (RFIC), a first secondary RFIC, and a second secondary RFIC. The first secondary RFIC is configured to receive a radio frequency (RF) signal from a device via antenna elements based on a first beam setting, and transmit the RF signal to the primary RFIC. The primary RFIC is configured to receive the RF signal; down-convert the RF signal to an intermediate frequency (IF) signal; transmit the IF signal to a baseband processor; receive, from the baseband processor, a control signal including a second beam setting; and transmit the control signal to the second secondary RFIC. The second secondary RFIC is configured to receive the control signal from the first primary RFIC, and receive the first RF signal from the device via second antenna elements based on the second beam setting.

20 Claims, 16 Drawing Sheets

(51) Int. Cl.
  *H04W 52/38* (2009.01)
  *H04W 16/28* (2009.01)
  *H04B 7/0408* (2017.01)
  *H04W 88/08* (2009.01)
  *H04B 7/06* (2006.01)

(52) U.S. Cl.
  CPC ........... *H04W 76/046* (2013.01); *H04B 7/063* (2013.01); *H04W 88/085* (2013.01)

(56) References Cited

U.S. PATENT DOCUMENTS

| | | | |
|---|---|---|---|
| 8,553,821 B1 | 10/2013 | Eliaz | |
| 2011/0069605 A1 | 3/2011 | Laudel et al. | |
| 2012/0028690 A1 | 2/2012 | Liu | |
| 2012/0328036 A1* | 12/2012 | Chang | H01Q 1/2258 375/267 |
| 2014/0022125 A1* | 1/2014 | Zhu | H01Q 3/2611 342/377 |
| 2014/0204902 A1* | 7/2014 | Maltsev | H04W 36/0083 370/331 |
| 2014/0206368 A1* | 7/2014 | Maltsev | H04W 72/0406 455/450 |
| 2014/0308892 A1* | 10/2014 | Lee | H04B 7/1858 455/9 |
| 2016/0134412 A1* | 5/2016 | Zimmerman | H04L 5/08 370/297 |
| 2016/0150542 A1* | 5/2016 | Tarighat Mehrabani | H04W 16/28 370/329 |
| 2016/0150591 A1* | 5/2016 | Tarighat Mehrabani | H04W 76/046 370/329 |
| 2016/0156490 A1 | 6/2016 | Tarighat Mehrabani et al. | |
| 2016/0308563 A1 | 10/2016 | Ouyang et al. | |

OTHER PUBLICATIONS

"Small Cell Millimeter Wave Mesh Backhaul—The first step for Millimeter Wave Hotspot deployments," Feb. 2013, White Paper, InterDigital Inc, 24 pages.

* cited by examiner

SWITCHING DIVERSITY IN SCALABLE RADIO FREQUENCY COMMUNICATION SYSTEM

CROSS-REFERENCE TO RELATED APPLICATIONS

The present application claims the benefit of U.S. Provisional Patent Application Ser. No. 62/085,011, entitled "Scalable and Modular RF Solution for High Performance mmWave Communications," filed on Nov. 26, 2014, and U.S. Provisional Patent Application Ser. No. 62/152,759, entitled "Scalable and Modular RF Solution for High Performance mmWave Communications," filed on Apr. 24, 2015, both of which are hereby incorporated by reference in their entireties for all purposes.

TECHNICAL FIELD

The present description relates generally to a communication system, including switching diversity in scalable radio frequency communication system.

BACKGROUND

Millimeter wavelength (mmWave) applications in consumer electronics typically benefit from lower power and cost in exchange for lower performance (e.g., shorter range). On the other end of the spectrum, backhaul mmWave applications may have high performance requirements in terms of range and coverage but can tolerate higher power consumption and cost. For example, backhaul mmWave applications may require a large number of antenna elements, such as 50 or more antenna elements.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
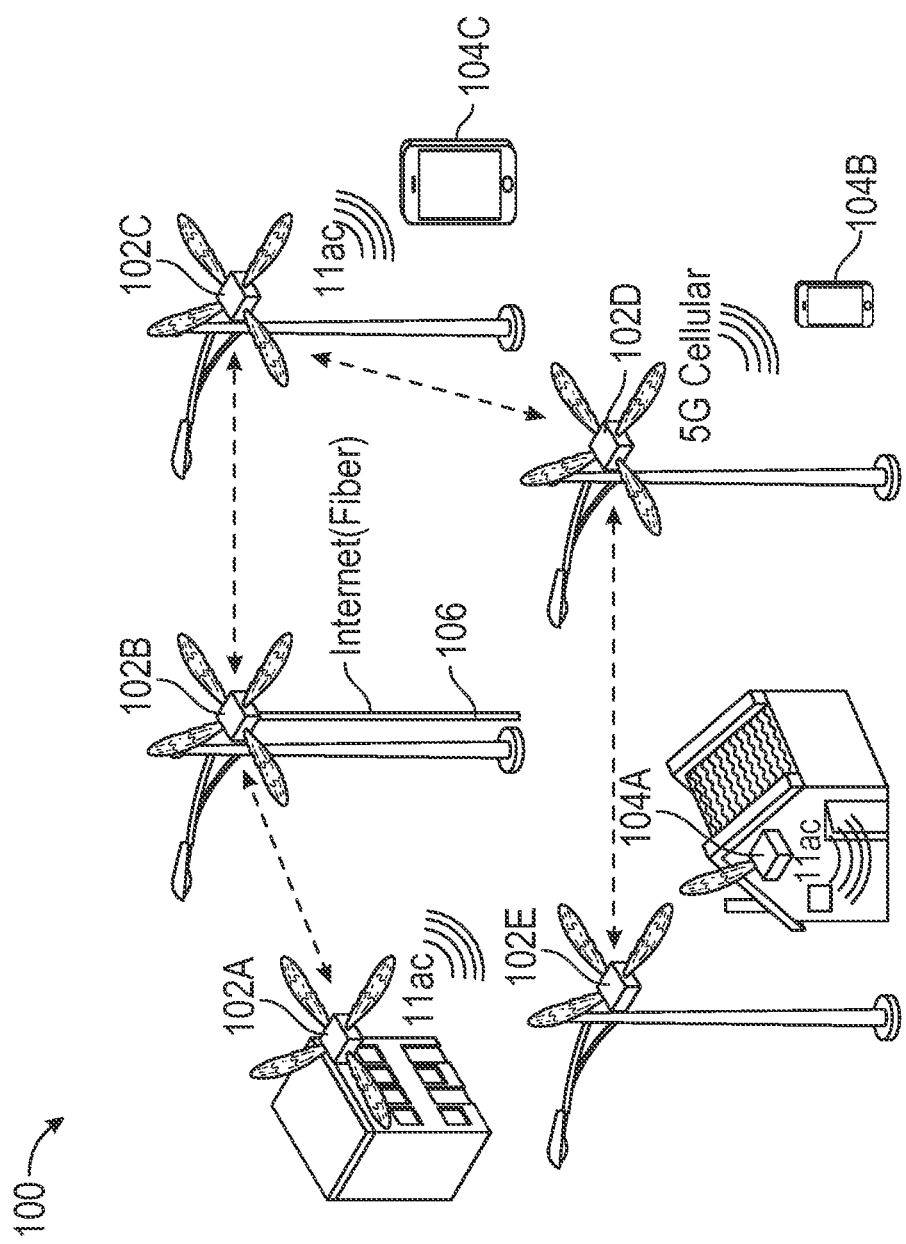
FIG. 1 illustrates an example network environment in which switching diversity in a scalable radio frequency communication system may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject scalable radio frequency (RF) communication system includes an RFIC die design that can be applied to both consumer electronic and backhaul applications. The scalable RF communication system includes a primary RFIC and one or more secondary RFICs. The primary RFIC receives an intermediate frequency (IF) signal from a baseband processor, upconverts the IF signal to an RF signal, performs phase shifting on the RF signal, and transmits the RF signal to each of the secondary RFICs for transmission via antenna elements of the secondary RFICs. The secondary RFICs receive the RF signal from the primary RFIC, phase shift the RF signal, e.g. to implement beamforming, and transmit the RF signal via the antenna elements. Beamforming can be used in the subject system, for example, to generate combined beams (with higher transmit and receive gain), and/or to generate distinct beam patterns covering multiple directions at the same time.

The subject system may facilitate switching diversity through the utilization of different groups of antenna elements included in the subject system. The switching diversity may allow different combinations and/or different groups of antenna elements to be utilized to transmit and/or receive beams associated with different beam settings, even during transmission/reception of the same physical layer (PHY) packet. The different beam settings may be associated with different beamforming, and may involve, by way of non-limiting example, beams in different directions, beams at different power levels, beams using different groups of antenna elements, etc. Switching diversity may be implemented to facilitate maintaining of a quality of communication between two devices (e.g., a base station device and a user device). Higher quality communication may be associated with, for example, a higher signal-to-noise ratio (SNR) and/or a lower number of iterations associated with decoding of low-density parity check (LDPC) codes.

In some cases, the switching diversity may allow switching (or transitioning) from use of a beam associated with one beam setting, e.g. utilizing one group of antenna elements, to use of a beam associated with another beam setting, e.g. utilizing another group of antenna elements, to facilitate maintaining the quality of the communication, such as in response to changes in link characteristics. The changes may include, for example, a change in a location of one or both devices participating in the communication and/or a change in a channel utilized in the communication (e.g., an obstruction has been introduced in the channel between the devices). In some cases, the beam switching may occur within the transmission/reception of a single packet. In this regard, beams of different beam settings may be utilized to transmit/receive a single packet.

One application of the subject system may include mmWave communications, including Institute of Electrical and Electronics Engineers (IEEE) 802.11ad, IEEE 802.11aj, IEEE 802.11ay, IEEE 802.15.3c and related standards such as Wi-Fi/WiGig Serial Bus, WiGig SD Extension, WiGig Bus Extension and WiGig Display Extension (all making use of 802.11ad/aj/ay PHY), Wireless HD (making use of 802.15.3c PHY). The description below uses mmWave as an example, but the subject system is widely applicable in other communication environments.

FIG. 1 illustrates an example network environment 100 in which switching diversity in a scalable radio frequency communication system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes one or more base station devices 102A-E and one or more user devices 104A-C. One or more of the base station devices 102A-E, such as the base station device 102B, may be coupled to a network, such as the Internet, via a transmission media 106, such as a fiber optic transmission media. In one or more implementations, the transmission media 106 may be shared by tens, hundreds, thousands, or any number of base station devices 102A-E and/or nodes. The base station devices 102A-E utilize one or more wireless communication technologies, such as mmWave technologies, to communicate with one another, e.g. via backhaul communications. For example, the base station devices 102A,C-E may utilize backhaul communications to access/share the network connection of the base station device 102B, e.g. via the transmission media 106. The base station devices 102A-E may be arranged in a star topology, a ring topology, a mesh topology, or generally any network topology through which backhaul communications may be implemented.

The base station devices 102A-E also communicate with one or more of the user devices 104A-C using one or more wireless communication technologies, such as Wi-Fi (802.11ac, 802.11ad, etc.), cellular (3G, 4G, 5G, etc.). For example, the base station devices 102A,C may communicate with one or more of the user devices 104A-C using 802.1ac communications, while the base station device 102D may communicate with one or more of the user devices 104A-C using 5G cellular communications. In one or more implementations, the base station devices 102A-E may have a small form factor, such as five inches by five inches by five inches (height by width by depth), and may be mounted, for example, on telephone poles and/or other municipal infrastructure. Thus, the base station devices 102A-E may be used to provide low-cost municipal Wi-Fi, e.g. nodes utilizing 802.11ac technology and/or communicating over unlicensed bands, for providing 4G/5G small cell backhauling, and/or for providing broadband and fiber to homes and/or dwelling units, e.g. to cover the last mile through multiple hops to provide, e.g. gigabit speeds to homes and/or dwelling units.

In order to provide high throughput backhaul communications, e.g. using mmWave communications, the base station devices 102A-E may include a large number of antenna elements, such as tens, hundreds, thousands, or any number of antenna elements, to implement directional beamforming. Thus, the base station devices 102A-E may implement the subject scalable RF communication system using multiple RFICs, e.g. as is discussed below with respect to FIGS. 2, 3, and 12. Since the user devices 104A-C may not provide high throughput backhaul communications, the user devices 104A-C may utilize a lesser number of antenna elements than the base station devices 102A-E. Thus, the user devices 104A-C may implement the subject scalable RF communication system using a single RFIC.

Figure 2:
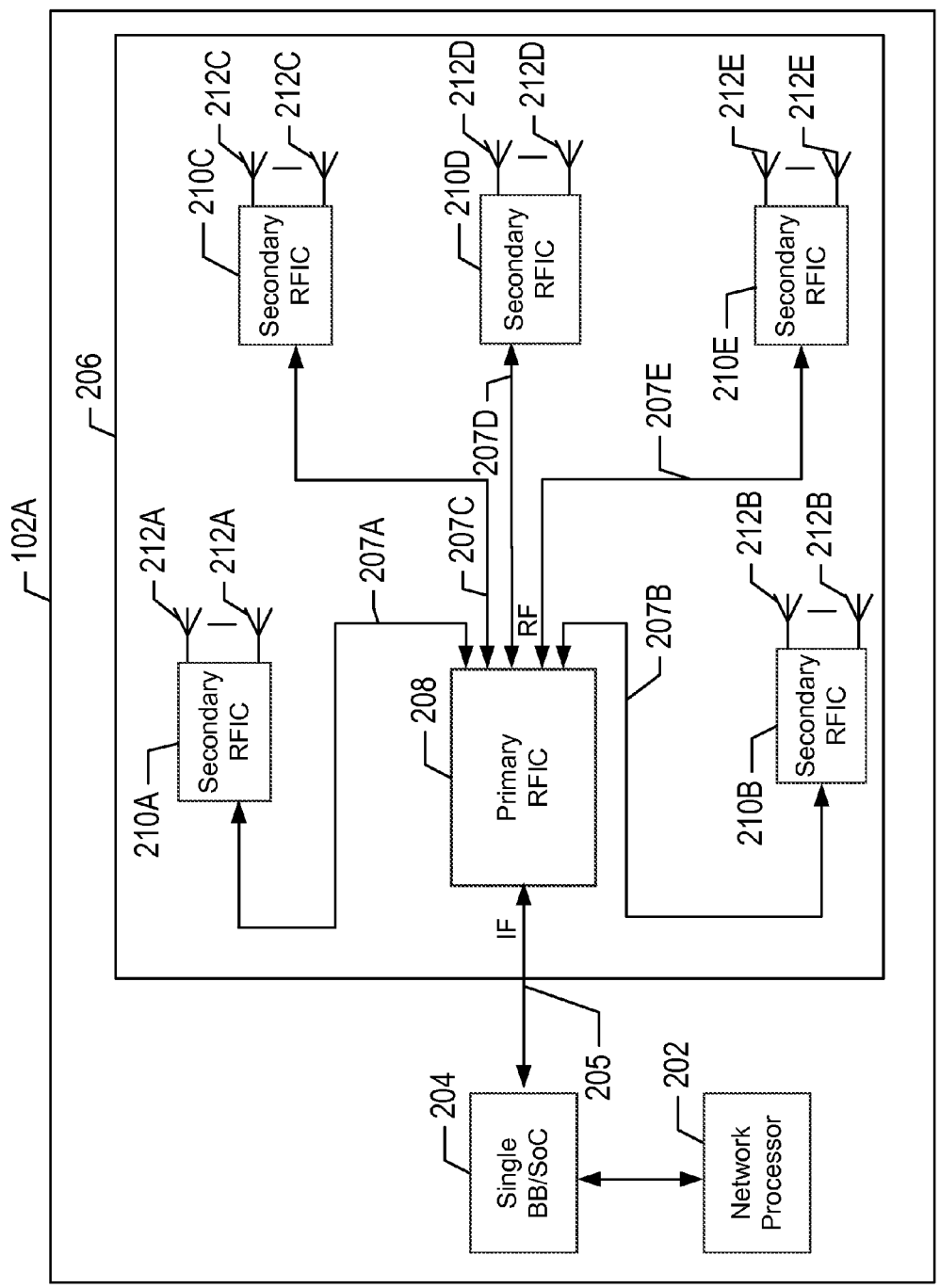
FIG. 2 illustrates an example base station device implementing switching diversity in a scalable radio frequency communication system in accordance with one or more implementations.

FIG. 2 illustrates an example base station device 102A implementing switching diversity in a scalable radio frequency communication system 206 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example base station device 102A includes a network processor 202, a single baseband processor 204, and the scalable RF communication system 206. The baseband processor 204 may be, may include, and/or may be part of a system on a chip (SoC). The scalable RF communication system 206 includes a primary RFIC 208 and a number of secondary RFICs 210A-E. Each of the secondary RFICs 210A-E includes a number of antenna elements 212A-E. The number of antenna elements in each of the secondary RFICs 210A-E may be the same, or may be different, from each other. In one or more implementations, the primary RFIC 208 may be referred to as a "master" RFIC and the secondary RFICs 210A-E may be referred to as "slave" RFICs.

For explanatory purposes, the scalable RF communication system 206 is illustrated as including five secondary RFICs 210A-E directly coupled to the primary RFIC 208. However, the scalable RF communication system 206 may include any number of secondary RFICs 210A-E directly coupled to the primary RFIC 208. For example, the scalable RF communication system 206 may include ten secondary RFICs 210A-E, each of which includes twelve antenna elements 212A-E. In this instance, the scalable RF communication system 206 may include one hundred and twenty antenna elements 212A-E that are combined with the baseband processor 204 to provide, for example, 4.6 Gigabits per second (Gbps) at approximately 300 meters range and with a full link power consumption of approximately 3.9 watts. In one or more implementations, one or more of the secondary RFICs 210A-E may be used for redundancy and/or yield.

The baseband processor 204 is coupled to the primary RFIC 208 via a transmission media 205. The transmission media 205 may be, for example, a coaxial transmission media, or generally any transmission media that can carry an intermediate frequency (IF) signal. In one or more implementations, the baseband processor 204 is directly coupled to exclusively the primary RFIC 208 via the transmission media 205, e.g. the baseband processor 204 is not directly coupled to any of the secondary RFICs 210A-E. The primary RFIC 208 is coupled to each of the secondary RFICs 210A-E via transmission media 207A-E. The transmission media 207A-E may be, for example, a waveguide, or generally any transmission media that can carry an RF signal.

The baseband processor 204 may communicate control information for one or more of the primary RFIC 208 and/or the secondary RFICs 210A-E via the transmission media 205 to the primary RFIC 208. In this regard, the baseband processor 204 may generate and transmit control signals that contain the control information to the primary RFIC 208. The control information may include, for example, phase shifting information, gain information, power control information, or generally any control information that may be relevant to one or more of the RFICs 208, 210A-E. For example, the baseband processor 204 may determine a subset of the secondary RFICs 210A-E to use for any given communication, e.g. based on link budget needs, such as range, performance, etc. The baseband processor 204 may then transmit, to the primary RFIC 208, power control information that corresponds to each of the secondary RFICs 210A-E. The primary RFIC 208 relays the power control information to the appropriate secondary RFICs 210A-E. The power control information may indicate whether each of the RFICs 210A-E, and/or a portion or all of the antenna elements 212A-E of each of the RFICs 210A-E, should be powered on or off for any given communication, and/or may indicate specific transmission power levels corresponding to each of the secondary RFICs 210A-E. The control information may indicate whether the primary RFIC 208 should be powered on or off for any given communication. In some cases, when the primary RFIC 208 is powered off, the secondary RFICs 210A-E associated with the primary RFIC 208 are also powered off.

The control information transmitted by the baseband processor 204 may be individually addressed to one or more of the primary RFIC 208 and/or the secondary RFICs 210A-E, such as by including pages and/or identifiers corresponding to each of the RFICs 208, 210A-E. The primary RFIC 208 may be coupled to one or more of the secondary RFICs 210A-E via one or more out-of-band control channels. When the primary RFIC 208 receives control information addressed to one or more of the secondary RFICs 210A-E, the primary RFIC transmits the control information to the appropriate secondary RFICs 210A-E, e.g. via the out-of-band control channel as is discussed further below with respect to FIGS. 4 and 5.

Thus, in the transmit direction, the primary RFIC 208 receives an IF signal from the baseband processor 204 via the transmission media 205, upconverts the IF signal to an RF signal, phase shifts the RF signal and then transmits the RF signal to each of the secondary RFICs 210A-E via the transmission media 207A-E. The secondary RFICs 210A-E receive the RF signal from the primary RFIC 208, phase shift the RF signal (e.g. in unison to effectuate directional beamforming) and transmit the RF signal via the antenna elements 212A-E. The phase shifters in each of the secondary RFICs 210A-E may be switched in a synchronized manner to ensure proper functioning of beam refinement algorithms, e.g. by avoiding undesired transient variation patterns. For example, each of the secondary RFICs 210A-E may include a synchronized timer that is used to switch the phase shifters of each of the secondary RFICs 210A-E in a synchronized manner. An example transmit process of the subject system is discussed further below with respect to FIG. 6.

In the receive direction, the secondary RFICs 210A-E receive an RF signal via the antenna elements 212A-E, phase shift the received signal and transmit the received RF signal to the primary RFIC 208 via the transmission media 207A-E. The primary RFIC 208 phase shifts and combines the received RF signals, downconverts the RF signals to IF, and transmits the IF signal to the baseband processor 204 via the transmission media 205. Thus, while the primary RFIC 208 includes mixers for upconverting/downconverting, the secondary RFICs 208A-E may not include any mixers and/or may not include any active or powered mixers.

In one or more implementations, the scalable RF communication system 206 may allow the primary RFIC 208 and/or the secondary RFICs 210A-E, or components thereof, to be controlled to provide additional degrees of freedom for facilitate switching diversity. In some cases, the baseband processor 204 may cause a switch (e.g., a transition) of transmission and/or reception of signals using beams of a first beam setting to using beams of a second beam setting. For example, the transition may involve switching from utilizing one subset of the secondary RFICs 210A-E to generate the beams of the first beam setting to another subset of the secondary RFICs 210A-E to generate the beams of the second beam setting. In this regard, the first and second beam settings may each be associated with a different subset of the secondary RFICs 210A-E that causes generation of the beams of the first or second beam settings. The ability to switch between using one subset of secondary RFICs to using another subset of secondary RFICs may provide additional degrees of freedom, e.g. directionally, with regard to the beams that may be generated using the primary RFIC 208 and the secondary RFICs 210A-E.

The baseband processor 204 may generate and/or transmit control signals that may cause the scalable RF communication system 206 to switch from using beams of one beam setting to using beams of another beam setting. By way of non-limiting example, the control signals may include phase shifter adjustments, phase shift changes, gain adjustments, power operation adjustments, etc. to the primary RFIC 208 and/or one or more of the secondary RFICs 210A-E. The various adjustments may be effectuated through adjusting characteristics of certain components in the primary RFIC 208 and/or the secondary RFICs 210A-E, and/or powering on or off certain components. For example, a phase shift applied by phase shifters and/or a gain provided by amplifiers and/or phase shifters of the primary RFIC 208 and/or one or more of the secondary RFICs 210A-E may be adjusted. In some cases, to cause switching from beams of one beam setting to beams of another beam setting, the control signals may indicate which of the secondary RFICs 210A-E should remain off, should remain on, should be powered on, and/or should be powered off.

For example, the baseband processor 204 may detect a movement of a user device serviced by the scalable RF communication system 206 and, in response to the movement, may transmit control signals to the primary RFIC 208 to cause a transition in which communication from the user device performed by the secondary RFICs 210C-E (e.g., to generate beams of one beam setting) prior to the transition is performed by the secondary RFIC 210A (e.g., to generate beams of another beam setting) after the transition. The baseband processor 204 may detect the movement based on, for example, measurements (e.g., power measurements, phase measurements) of signals (e.g., RF signals) received from the user device. Changes in these measurements (e.g., changes in measured power levels of the signals) over time may be indicative of movement of the user device.

As another example, in response to the movement of the user device, the baseband processor 204 may transmit control signals to the primary RFIC 208 to cause a transition in which communication from the user device performed by the secondary RFICs 210C-E prior to the transition are performed by the secondary RFIC 210C-D after the transition. In this regard, the transition may involve powering off the secondary RFIC 210E, or placing the secondary RFIC 210E in a low power or idle mode. For instance, fewer of the secondary RFICs 210C-E may be utilized for communication with the user device when the user device moves closer to the base station device 102A. The use of the secondary RFICs 210C-D may allow generation of a beam with a similar radiation pattern as the beam generated by the secondary RFICs 210C-E, but at a lower power level. The secondary RFIC 210E may be powered off or placed in a low power or idle mode to lower power consumption of the scalable RF communication system 206.

In one or more implementations, the primary RFIC 208 and/or the secondary RFICs 210A-E may be physically positioned (e.g., distributed) in the scalable RF communication system 206 to provide additional degrees of directional freedom to facilitate switching diversity. In some cases, the secondary RFICs 210A-E, and their associated antenna elements 212A-E, may be physically distributed within an enclosure. For example, in FIG. 2, the secondary RFICs 210C-E are arranged closer to a right wall of the enclosure of the base station device 102A, the secondary RFIC 210B is arranged closer to a bottom wall of the enclosure of the base station device 102A, and the secondary RFIC 210A is arranged closer to an upper wall of the enclosure of the base station device 102A. The baseband processor 204 may group the secondary RFICs 210A-E into secondary RFIC groupings/sectors based on the location of the secondary RFICs 210A-E within the enclosure. For example, a first secondary RFIC grouping may include the secondary RFICs 210C-E, a second secondary RFIC grouping may include the secondary RFIC 210B, and a third secondary RFIC grouping may include the secondary RFIC 210A. In one or more implementations, the sectors may also refer to the coverage areas of the secondary RFICs 210A-E. For example, the first secondary RFIC grouping may be utilized to provide coverage for a first sector.

In one or more implementations, the baseband processor 204 may search across multiple secondary RFIC groupings and determine one or more secondary RFIC groupings for communicating with the user device based on one or more criteria. The criteria may include, by way of non-limiting example, location of the user device, channel (e.g., propagation environment) between the user device and the secondary RFIC grouping(s), SNR, number of iterations associated with decoding of LDPC codes, etc. In some cases, the baseband processor 204 may associate each secondary RFIC grouping with a line of sight (LOS) for communication purposes. For example, the baseband processor 204 may generate control signals that cause some or all of the secondary RFIC groupings to communicate with a user device based on the user device's location in relation to the LOS of the secondary RFIC groupings.

The baseband processor 204 may generate control signals that cause switching communication with the user device from using beams of a first beam setting from a first secondary RFIC grouping (e.g., the secondary RFICs 210C-E) to using beams of a second beam setting from a second secondary RFIC grouping (e.g., the secondary RFIC 210B). The control signals may be generated and the switching effectuated in response to, for example, detection of a movement of the user device's location out of the LOS associated with the first secondary RFIC grouping and into the LOS of the second secondary RFIC grouping. The baseband processor 204 may determine the user device's location based, for example, on measurements (e.g., power measurements) of RF signals received from the user device. The different beam settings may be associated with different beamforming, and may involve, by way of non-limiting example, beams in different directions, beams at different power levels (e.g., powering on or off different numbers of RFICs in the secondary RFIC groupings), etc.

In some cases, the baseband processor 204 may generate control signals that cause one or multiple secondary RFIC groupings to communicate with the same user device. In some cases, the baseband processor 204 may generate control signals that cause one subset of secondary RFIC groupings to communicate with one user device and another subset of secondary RFIC groupings to communicate with another user device. For example, the baseband processor 204 may generate control signals that cause the primary RFIC 208 to transmit an RF signal to the subsets of secondary RFIC groupings for transmission by the secondary RFIC groupings to the user devices. The RF signal transmitted to each of the subsets of secondary RFIC groupings may be the same, or may be different, from each other. In one or more implementations, multiple beams may be generated and transmitted simultaneously by the scalable RF communication system 206. The beams may be associated with one or more different beam settings. The different beam settings may be associated with different beamforming, and may involve, by way of non-limiting example, beams in different directions, beams at different power levels (e.g., powering on or off different numbers of RFICs in the secondary RFIC groupings), etc.

In some cases, the grouping of the secondary RFICs 210A-E may be statically determined/set by the baseband processor 204. In other cases, the grouping may be dynamically determined/set by the baseband processor 204, e.g. based on location(s) of the user device(s), channel(s) between the scalable RF communication system 206 and the user device(s), etc. In some cases, the baseband processor 204 may designate the secondary RFIC groupings such that they may overlap (e.g., one or more of the secondary RFICs 210A-E may be grouped into multiple secondary RFIC groupings). In some cases, the baseband processor 204 may designate the secondary RFIC groupings such that they do not overlap. Transitioning from transmitting a beam by one secondary RFIC grouping to transmitting a beam by another secondary RFIC grouping may be fast since the secondary RFICs 210A-E are associated with (e.g., controlled by) the same primary RFIC 208 and the primary RFIC 208 remains on during operation of any of the secondary RFIC groupings.

An example primary RFIC 208 is discussed further below with respect to FIG. 4 and an example secondary RFIC 210A is discussed further below with respect to FIG. 5. Lastly, example layouts and substrates, e.g. printed circuit board (PCB) layouts, of the subject scalable radio frequency communication system are discussed further below with respect to FIGS. 13-15.

For explanatory purposes, the scalable RF communication system 206 of FIG. 2 is illustrated as having one tier, or one level, of separation between the primary RFIC 208 and the secondary RFICs 210A-E. However, the scalable RF communication system 206 may include multiple levels and/or tiers, e.g. in a cascaded or hierarchical fashion, between the primary RFIC 208 and the secondary RFICs 210A-E. Thus, the scalable RF communication system 206 may include one or more levels or tiers of intermediate RFICs between the primary RFIC 208 and the secondary RFICs 210A-E. In this manner, the scalable RF communication system 206 can fan out/scale to an even greater number of antenna elements 212A-E without altering the design of the RFICs 208, 210A-E.

In one or more implementations, one or more of the network processor 202, the baseband processor 204, the primary RFIC 208, one or more of the secondary RFICs 210A-E, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
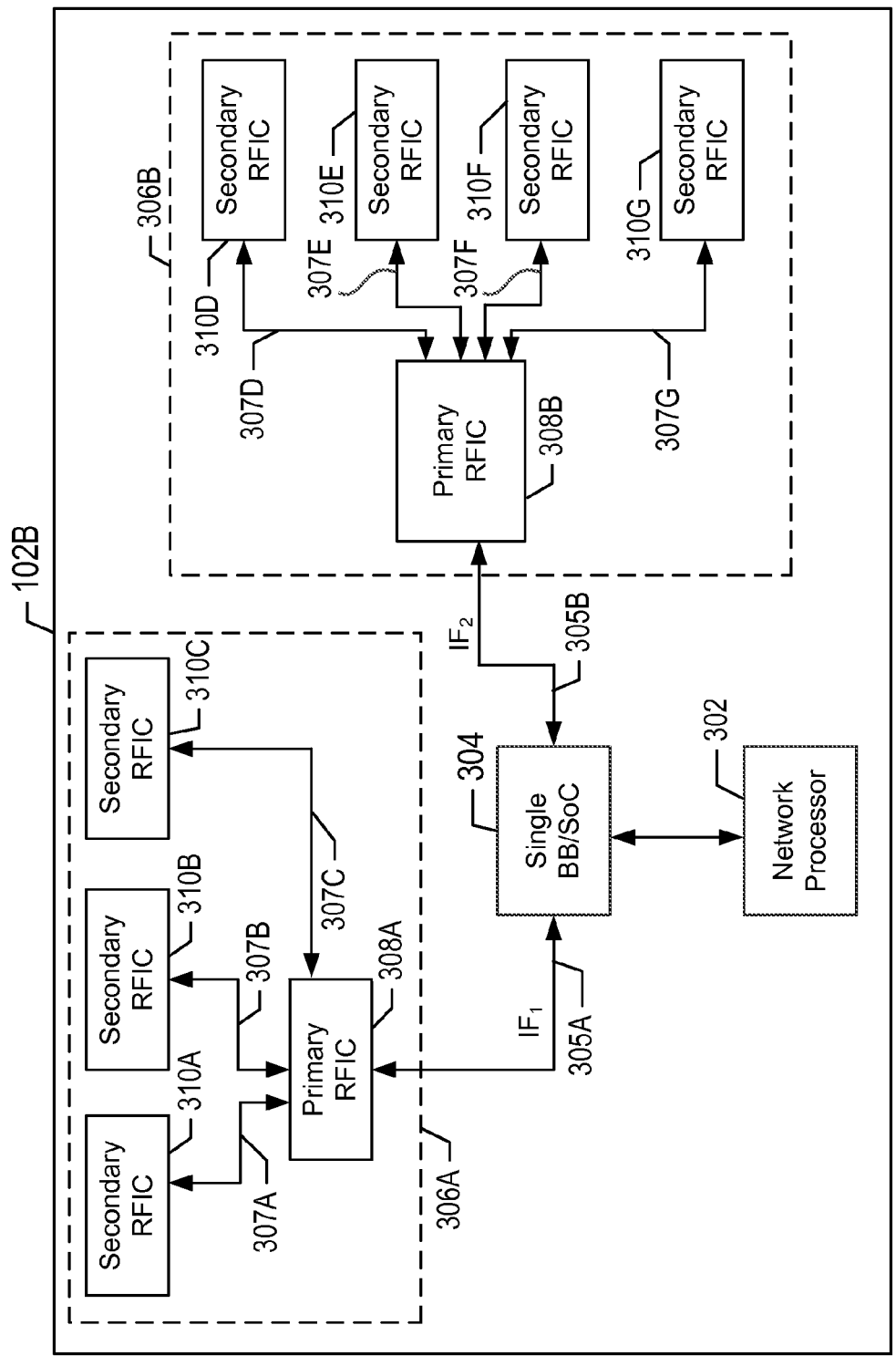
FIG. 3 illustrates an example base station device implementing switching diversity in a scalable radio frequency communication system in accordance with one or more implementations.

FIG. 3 illustrates an example base station device 102B implementing switching diversity in a scalable RF communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided. The description of FIG. 2 with respect to various components (e.g., the baseband processor 204, the scalable RF communication systems 206 of the base station device 102A) generally applies to corresponding components in the base station device 102B.

The base station device 102B includes a network processor 302, a baseband processor 304, and scalable RF communication systems 306A-B. The scalable RF communication system 306A includes a primary RFIC 308A and a number of secondary RFICs 310A-C. The scalable RF communication system 306B includes a primary RFIC 308B and a number of secondary RFICs 310D-G. Each of the secondary RFICs 310A-E includes a number of antenna elements (not shown). The baseband processor 304 may generate control signals for the primary RFICs 308A-B and the secondary RFICs 310A-G.

For explanatory purposes, the scalable RF communication system 306A is illustrated as including three secondary RFICs 310A-C directly coupled to the primary RFIC 308A, and the scalable RF communication system 306B is illustrated as including four secondary RFICs 310D-G directly coupled to the primary RFIC 308B. However, the scalable RF communication systems 306A-B may include any number of secondary RFICs directly coupled to the corresponding primary RFIC. The baseband processor 304 is coupled to the primary RFICs 308A-B via transmission media 305A-B. The transmission media 305A-B may be, for example, coaxial transmission media, or generally any transmission media that can carry an IF signal between the primary RFICs 308A-B and the baseband processor 304. Frequency of the IF signals propagating through each transmission media 305A-B may be the same or may be different. The primary RFICs 308A-B are directly coupled to each of the secondary RFICs 310A-G via transmission media 307A-G. The transmission media 307A-G may be, for example, a waveguide, or generally any transmission media that can carry an RF signal.

In one or more implementations, the scalable RF communication systems 306A-B are physically distributed within one enclosure or across multiple enclosures. The physical distribution may be utilized to provide additional degrees of freedom to facilitate switching diversity. In some cases, the base station device 102B may include one enclosure, with the scalable RF communication systems 306A-B distributed in different areas with the enclosure (e.g., along different sides of the enclosure).

In other cases, the base station device 102B may be distributed across multiple enclosures. For example, one enclosure (e.g., one box) may include the network processor 302, the baseband processor 304, and one of the scalable RF communication systems 306A-B, whereas another enclosure may include the other of the scalable RF communication systems 306A-B. The baseband processor 304 may connect to each of the scalable RF communication systems 306A-B by way of the transmission media 305A-B. In some cases, the transmission media 305A-B may allow transmission of IF signals between the baseband processor 304 the primary RFICs 308A-B for over several meters without substantial loss. The distribution of the scalable RF communication systems 306A-B over longer physical distances may improve diversity and/or create a distributed access point. For example, the base station device 102B may be a distributed access point, e.g. distributed throughout a room, with a central box that includes at least the baseband processor 304.

The baseband processor 304 may group the secondary RFICs 310A-G into secondary RFIC groupings based on the location of the secondary RFICs 310A-G (e.g., with the same enclosure or distributed across multiple enclosures). For example, in FIG. 3, a first secondary RFIC grouping may include the secondary RFICs 310A-C and a second secondary RFIC grouping may include the secondary RFIC 310D-G. In such a case, each secondary RFIC grouping is associated with a corresponding primary RFIC (e.g., the primary RFICs 308A-B). In other cases, such as described with respect to FIG. 2, one primary RFIC may be associated with (e.g., coupled to) multiple secondary RFIC groupings.

In one or more implementations, the baseband processor 304 searches across multiple secondary RFIC groupings and determines one or more secondary RFIC groupings for communicating with the user device based on one or more criteria. The criteria may include, by way of non-limiting example, location of the user device, channel (e.g., propagation environment) between the user device and the secondary RFIC grouping(s), SNR, number of iterations associated with decoding of LDPC codes, etc. In some cases, the baseband processor 304 may associate each secondary RFIC grouping with a LOS for communication purposes.

In some cases, the grouping of the secondary RFICs 310A-G into secondary RFIC groupings may be statically determined/set by the baseband processor 304 (e.g., based on the associated primary RFICs 308A-B). In other cases, the grouping may be dynamically determined/set by the baseband processor 304, e.g. based on location(s) of the user device(s), channel(s) between the scalable RF communication systems 306A-B and the user device(s), etc. In some cases, the baseband processor 304 may designate the secondary RFIC groupings such that they may overlap (e.g., one or more of the secondary RFICs 310A-G may be grouped into multiple secondary RFIC groupings). In some cases, the baseband processor 304 may designate the secondary RFIC groupings such that they do not overlap.

One or both of the primary RFICs 308A-B may be utilized to cause transmission/reception by their respective secondary RFICs 310A-G. In one or more implementations, each of the primary RFICs 308A-B may cause transmission of one or more respective beams by one or more of the secondary RFICs 310A-G. The beams may be associated with one or more different beam settings. The different beam settings may be associated with different beamforming, and may involve, by way of non-limiting example, beams in different directions, beams at different power levels (e.g., powering on or off different numbers of RFICs in the secondary RFIC groupings), etc. In some cases, each of the primary RFICs 308A-B may receive different IF signals from the baseband processor 304 from which to generate and transmit RF signals, e.g. to an external device. In other cases, each of the primary RFICs 308A-B may receive the same IF signal from the baseband processor 304.

In one or more implementations, when a secondary RFIC grouping is not being utilized for transmission/reception, some or all of the secondary RFICs associated with the secondary RFIC grouping may be powered off. Power savings may be achieved by turning off the secondary RFICs. In some cases, latency associated with powering on the secondary RFICs is generally low. In some cases, the primary RFICs associated with a secondary RFIC grouping not being utilized may remain powered on. By keeping the primary RFICs powered on, subsequent utilization of (e.g., transitions to usage of) the secondary RFICs may be faster since ramp up of the primary RFICs, which remain on, is faster relative to a case in which the primary RFICs are turned off. In this regard, a latency associated with turning on the primary RFICs may be avoided by keeping the primary RFICs on. In some instances, the timing associated with turning on the primary RFICs may be dominated by turning on a phase-locked loop (PLL) of the primary RFICs, which may take 10 milliseconds.

Figure 4:
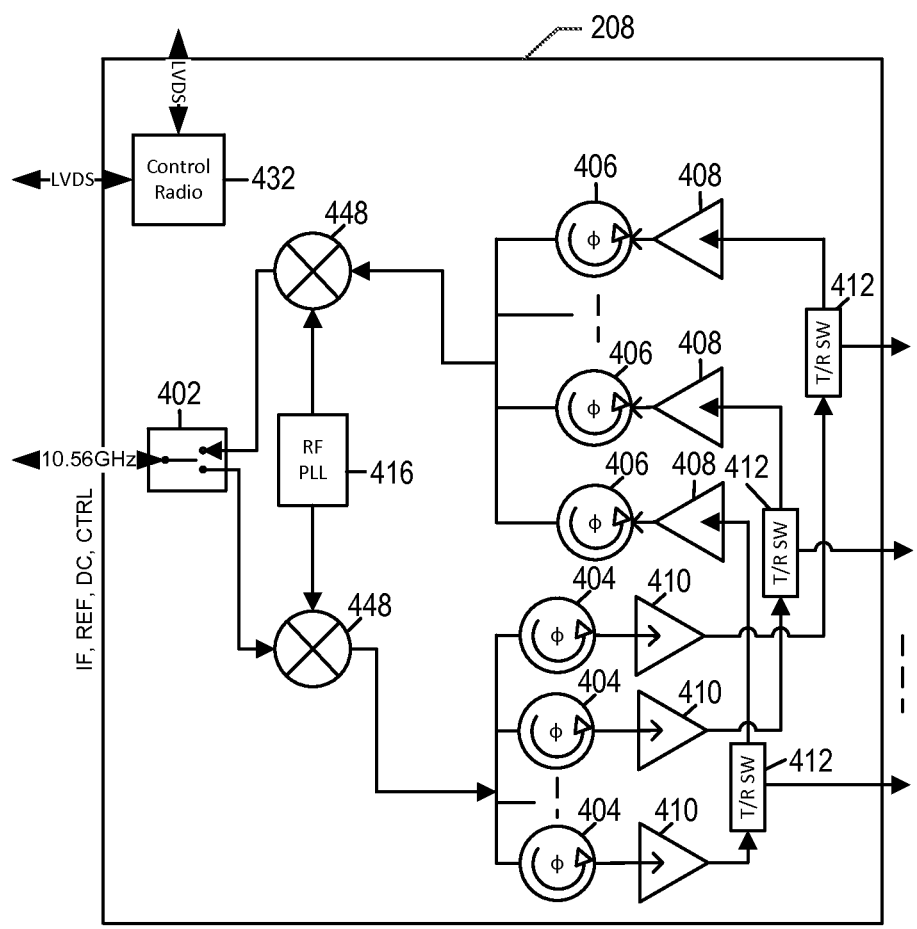
FIG. 4 illustrates a primary radio frequency (RF) integrated circuit (RFIC) that may be implemented in a scalable radio frequency communication system in accordance with one or more implementations.

FIG. 4 illustrates a primary RFIC 208 that may be implemented in a scalable RF communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided. Although FIG. 4 is described with respect to the primary RFIC 208 of FIG. 2, the description for FIG. 4 may also apply to the primary RFICs 308A-B of FIG. 3.

The primary RFIC 208 includes a control radio 432, a switch 402, a radio frequency phase locked loop (RFPLL) 416, mixers 448, transmit phase shifters 404, power amplifiers 410, transmit/receive switches 412, low noise amplifiers 408, and receive phase shifters 406.

An IF signal (e.g., 10.56 GHz) is received from the baseband processor 204 through the switch 402 and upconverted by the mixer 448 to an RF signal, e.g. 28 GHz, 30 GHz, 60 GHz, 70 GHz, etc. The transmit phase shifters 404 receive the RF signal and phase shift the RF signal, as appropriate to implement directional beamforming. The power amplifiers 410 receive the phase shifted RF signal from the transmit phase shifters 404 and amplify the phase shifted RF signal. The phase shifted and amplified RF signal are transmitted through the transmit/receive switches 412 and transmitted to the appropriate secondary RFICs (e.g., one or more of the secondary RFICs 210A-E of FIG. 2). The appropriate secondary RFICs may be coupled to the transmit/receive switches 412 via the transmission media 207A-E.

Similarly, RF signals received via the secondary RFICs pass through the transmit/receive switches 412, the low noise amplifiers 408, and the receive phase shifters 406. The amplified and phase shifted RF signals are combined and downconverted by the mixer 448 to an IF signal. The IF signal is then transmitted to the baseband processor 204 through the switch 402. The baseband processor 204 may be coupled to the switch 402 via the transmission media 205.

The primary RFIC 208 may receive control signals that contain control information from the baseband processor 204. For example, the baseband processor 204 may transmit control information associated with the primary RFIC 208 (and/or one or more secondary RFICs coupled thereto) via a control radio (not shown) of the baseband processor 204. The control information may be transmitted by the baseband processor 204 via low voltage differential signaling (LVDS). The control radio 432 of the primary RFIC 208 receives the control information over a control transmission medium, which may be, for example, a coaxial transmission medium. The control radio 432 may determine whether the control information is associated with the primary RFIC 208 and/or one or more secondary RFICs coupled thereto. When the control information is associated with one or more of the secondary RFICs, the control radio 432 may transmit the appropriate control information from the primary RFIC 208 to the appropriate secondary RFICs via an out-of-band communication channel. In one or more implementations, the out-of-band communication channel may be separate transmission media that is coupled to the control radio 432 of the primary RFIC 208 and separate control radios of each of the secondary RFICs.

The control radio 432 may process the control information and adjust one or more components appropriately based at least in part on the received control information. For example, the control radio 432 may effectuate the control information by adjusting one or more phase shifters 404 and/or 406 (e.g., to adjust beamforming), adjusting automatic gain control (AGC), powering up or down one or more components of the primary RFIC 208, or generally any control actions that may be performed/effectuated by the control radio 432. In some cases, the control radio 432 may include or may be coupled to a digital controller that processes the received control information.

In one or more implementations, one or more of the primary RFIC 208, the control radio 432, the switch 402, the RFPLL 416, the mixers 448, the transmit phase shifters 404, the power amplifiers 410, the transmit/receive switches 412, the low noise amplifiers 408, the receive phase shifters 406, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 5:
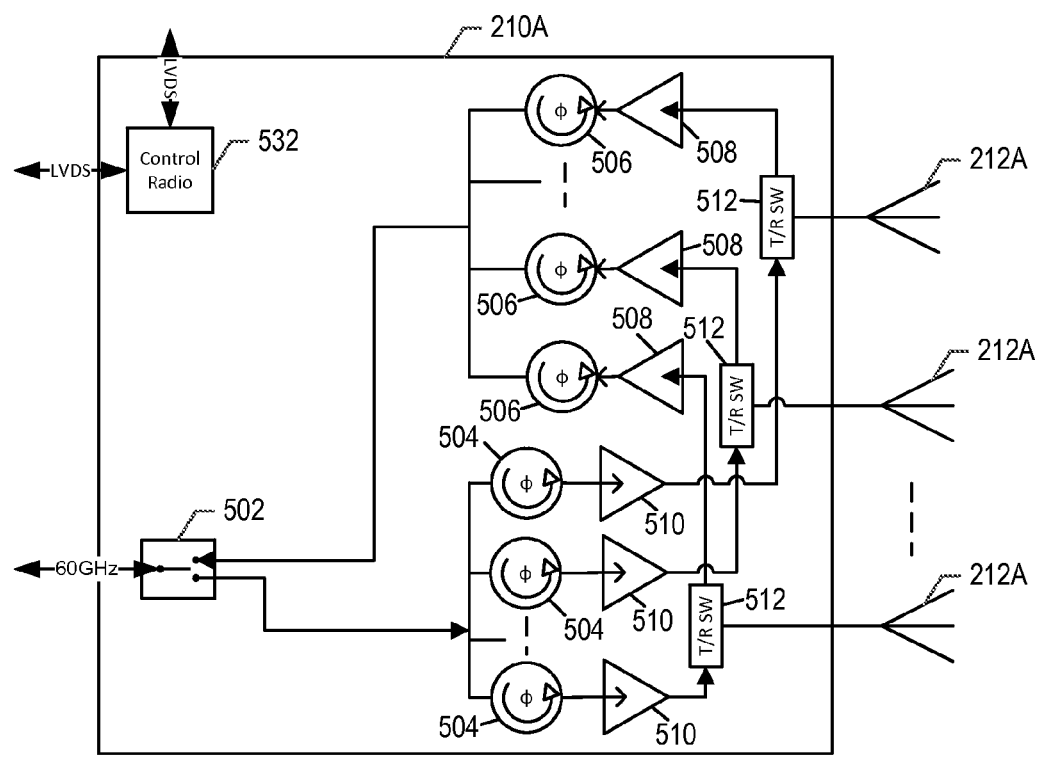
FIG. 5 illustrates a secondary RFIC that may be implemented in a scalable radio frequency communication system in accordance with one or more implementations.

FIG. 5 illustrates a secondary RFIC 210A that may be implemented in a scalable RF communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided. Although FIG. 5 is described with respect to the secondary RFIC 210A of FIG. 2, the description for FIG. 5 may also apply to the secondary RFICs 210B-E of FIG. 2 and/or the secondary RFICs 310A-G of FIG. 3.

The secondary RFIC 210A includes a control radio 532, a switch 502, transmit phase shifters 504, power amplifiers 510, transmit/receive switches 512, low noise amplifiers 508, receive phase shifters 506, and the antenna elements 212A.

An RF signal is received from a primary RFIC (e.g., the primary RFIC 208), which is passed through the switch 502. The RF signal is split and passed to the transmit phase shifters 504. The transmit phase shifters 504 phase shift the RF signal, as appropriate to implement directional beamforming, and transmits the phase shifted RF signal to the power amplifiers 510. The power amplifiers 510 amplify the phase shifted RF signal. The phase shifted and amplified RF signal is transmitted through the transmit/receive switches 512 and, e.g. external to the secondary RFIC 210A, via the antenna elements 212A.

Similarly, RF signals received via the antenna elements 212A pass through the transmit/receive switches 512, the low noise amplifiers 508, the receive phase shifters 506, and are combined. The combined RF signal is transmitted to the primary RFIC (e.g., the primary RFIC 208) through the switch 502. The primary RFIC may be coupled to the switch 502 via the transmission medium 207A.

The secondary RFIC 210A may receive control information from a primary RFIC (e.g., the primary RFIC 208) via the control radio 532. For example, the control information may be transmitted by the primary RFIC via LVDS. The control information may include, for example, power control information, phase shifting information, gain/power amplification information, etc. The control radio 532 may process the control information and adjust one or more components appropriately based at least in part on the received control information. For example, the control radio 532 may process the control information and may effectuate the control information by adjusting one or more phase shifters 504 and/or 506 (e.g., to adjust beamforming), adjusting AGC, powering up or down one or more components of the secondary RFIC 210A, or generally any control actions that may be performed/effectuated by the control radio 532. In some cases, the control radio 532 may include or may be coupled to a digital controller that processes the received control information.

In one or more implementations, one or more of the secondary RFIC 210A, the control radio 532, the switch 502, the transmit phase shifters 504, the power amplifiers 510, the transmit/receive switches 512, the low noise amplifiers 508, the receive phase shifters 506, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 6:
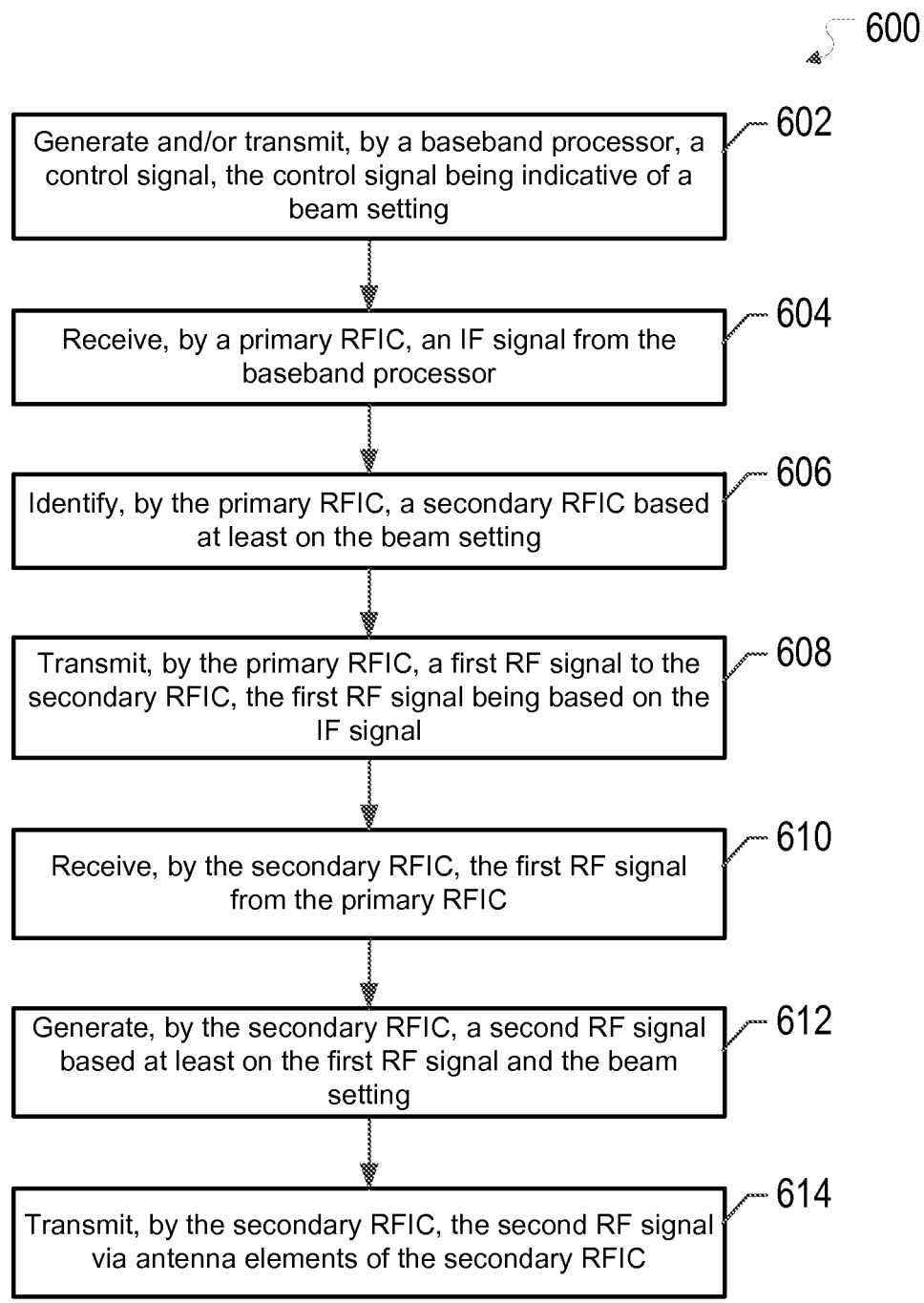
FIG. 6 illustrates a flow diagram of an example process for facilitating switching diversity in a scalable radio frequency communication system in accordance with one or more implementations.

FIG. 6 illustrates a flow diagram of an example process 600 for facilitating switching diversity in a scalable RF communication system in accordance with one or more implementations. For explanatory purposes, the example process 600 is described herein with reference to the base station device 102B of FIG. 3; however, the example process 600 is not limited to the base station device 102B of FIG. 3. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed.

The baseband processor 304 generates and/or transmits a control signal to the primary RFIC 308A (602). The control signal may be indicative of a beam setting (e.g., beam power, beam direction) to be utilized by the primary RFIC 308A. The primary RFIC 308A receives an IF signal from the baseband processor 304 (604). The primary RFIC 308A identifies at least one secondary RFIC (e.g., at least one of the secondary RFICs 310A-C) associated with the primary RFIC 308A based at least on the beam setting from the baseband processor 304 (606). The identified secondary RFIC(s) may be utilized for transmission of an RF signal. For example, the beam setting from the baseband processor 304 may be indicative of which secondary RFICs associated with the primary RFIC 308A should be utilized (e.g., powered on, powered off) to effectuate the beam setting. In some cases, the beam setting may indicate a beam power and/or a beam direction, and the primary RFIC 308A has autonomy to determine which of its secondary RFICs to utilize to effectuate the beam setting.

The primary RFIC 308A transmits a first RF signal to the identified secondary RFIC(s) (608), where the first RF signal is based on the IF signal. For example, the first RF signal may be generated by upconverting (e.g., using a mixer) the IF signal to obtain an RF signal, and phase shifting and/or amplifying the obtained RF signal to generate the first RF signal. The first RF signal may be transmitted to the identified secondary RFICs via a waveguide or other transmission media. In one or more implementations, the transmission media may be implemented on a printed circuit board (PCB) that includes the primary RFIC 308A and at least one of the secondary RFICs 310A-C.

The first RF signal is received by the identified secondary RFICs (610). The first RF signal is appropriately phase shifted and/or amplified by each of the identified secondary RFIC(s) (612), e.g. based at least in part on beam settings received from the baseband processor 304 (via the primary RFIC 208). Each of the identified secondary RFIC(s) 310A-C transmits the RF signal via multiple antenna elements, such as tens, hundreds, or thousands of antenna elements for each of the identified secondary RFICs (614).

The example process 600 can be effectively reversed for RF signals received by the secondary RFICs 310A-C over the antenna elements. That is, the RF signals may be received by one or more of the secondary RFICs 310A-C over the antenna elements, amplified and phase shifted, and transmitted (as RF signals) to the primary RFIC 308A. The primary RFIC 308A downconverts the received RF signals to IF and transmits the IF signals to the baseband processor 304.

The baseband processor 304 may send the same or different IF signals to each primary RFIC 308A-B. The baseband processor 304 may send the same or different beam settings to each primary RFIC 308A-B. In some cases, the baseband processor 304 may associate the secondary RFICs of each primary RFIC 308A-B with one or more secondary RFIC groupings. For example, the baseband processor 304 may associate the secondary RFIC 310A with one secondary RFIC grouping and the secondary RFICs 310B-C with another secondary RFIC grouping.

Figure 7:
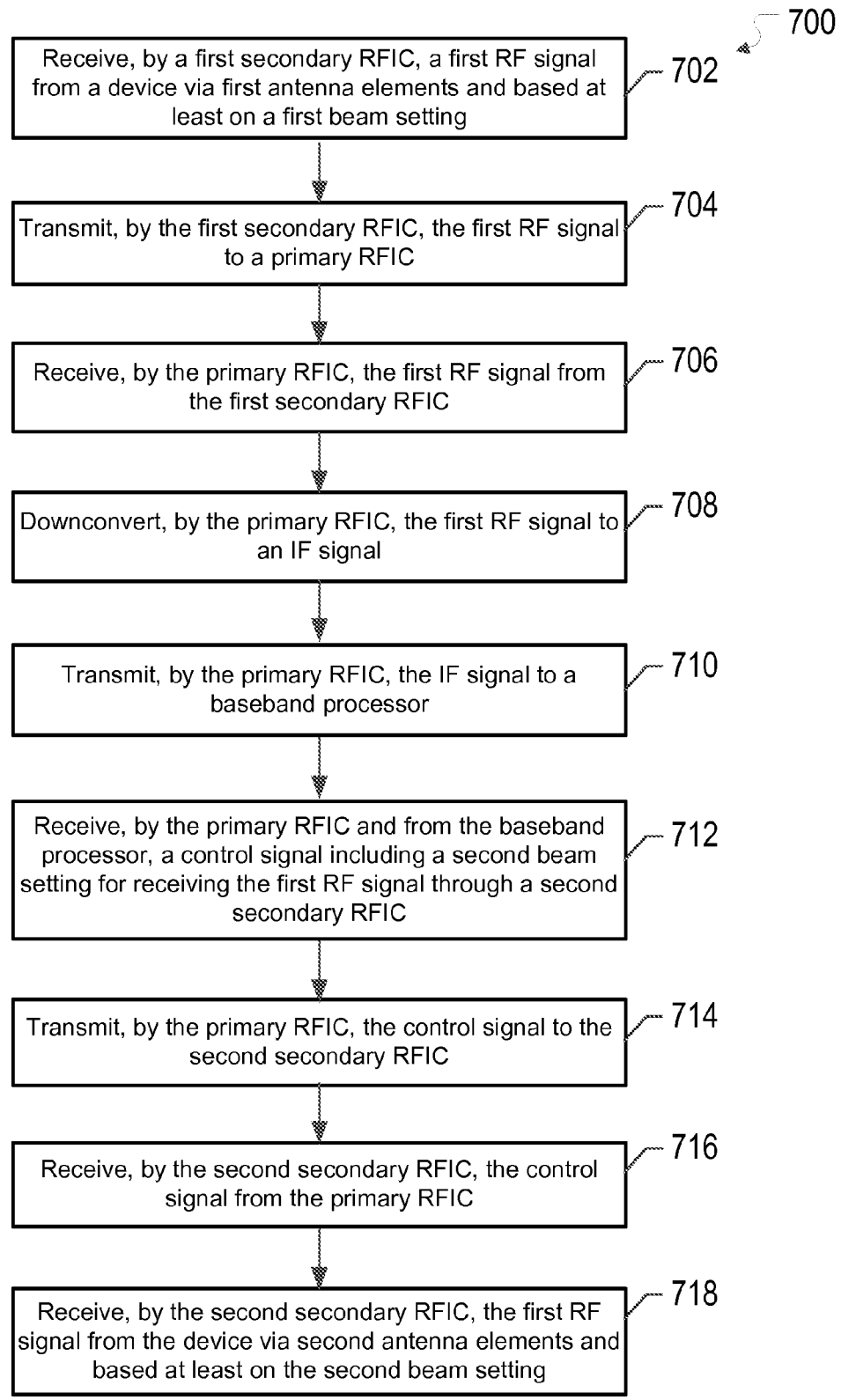
FIG. 7 illustrates a flow diagram of an example process for facilitating switching diversity in a scalable radio frequency communication system in accordance with one or more implementations.

FIG. 7 illustrates a flow diagram of an example process 700 for facilitating switching diversity in a scalable RF communication system in accordance with one or more implementations. For explanatory purposes, the example process 700 is described herein with reference to the base station device 102B of FIG. 3; however, the example process 700 is not limited to the base station device 102B of FIG. 3. Further for explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed.

A first secondary RFIC (e.g., the secondary RFIC 310A) receives a first RF signal from a device based at least in part on a first beam setting (702). The first secondary RFIC may receive the first RF signal via antenna elements of the first secondary RFIC. The device may be a base station device (e.g., the base station device 102C) or a user device (e.g., the user device 104B). The first secondary RFIC transmits the first RF signal to a primary RFIC (e.g., the primary RFIC 308A) (704). The first secondary RFIC may transmit the first RF signal via a transmission media (e.g., the transmission media 307A) coupling the first secondary RFIC to the primary RFIC.

The primary RFIC receives the first RF signal from the first secondary RFIC (706). The primary RFIC downconverts the first RF signal to an IF signal (708) and transmits the IF signal to the baseband processor 304 (710). The primary RFIC receives, from the baseband processor 304, a control signal that includes a second beam setting to be utilized for receiving the first RF through a second secondary RFIC (712). The primary RFIC transmits the control signal to the second secondary RFIC (714). For example, the primary RFIC may transmit the control signal to the second secondary RFIC via an out-of-band control channel to a control radio (e.g., the control radio 532 of FIG. 5) of the second secondary RFIC. The second secondary RFIC receives the control signal from the primary RFIC (716) and receives the first RF signal from the device based at least in part on the second beam setting (718). The first RF signal may be received by the second secondary RFIC via antenna elements of the second secondary RFIC.

The baseband processor 304 may determine the second beam setting based at least in part on the first RF signal. For example, the baseband processor 304 may perform measurements (e.g., power measurements) of the first RF signal and may determine the second beam setting based on the measurements. In some cases, the baseband processor 304 may determine a location of the device based on the first RF signal. For example, the baseband processor may receive the RF signals by way of multiple antenna elements across the different secondary RFICs 310A-G. At a given point in time, the baseband processor 304 may utilize differences in power of the first RF signal as received by the different secondary RFICs 310A-G and/or differences in time at which the first RF signal is received by the different secondary RFICs 310A-G to determine characteristics associated with the device that transmitted the first RF signal. The characteristics may include a distance and/or a location associated with the device. The characteristics may be utilized to determine the beam setting to be utilized for transmitting signals to and receiving signals from the device.

The control signal may include information pertaining to phase shifter settings (e.g., to effectuate directional beamforming). For example, the second secondary RFIC, upon receiving and processing the control signal, may effectuate the control signal by adjusting one or more of its phase shifters based on the phase shifter settings indicated by the control signal.

In some cases, the first secondary RFIC is not utilized in receiving the first RF signal when receiving the first RF signal based on the second beam setting. The primary RFIC may transmit at least a portion of the control signal to the first secondary RFIC. In response to receiving the portion of the control signal, the first secondary RFIC may power down a receive path of the first secondary RFIC or enter a low power mode. Thus, in this case, effectuating the control signal from the baseband processor 304 caused an adjustment in operation of the first secondary RFIC.

In some cases, the second secondary RFIC may be associated with (e.g., directly coupled to) the same primary RFIC as the first secondary RFIC. For example, the first secondary RFIC may be the secondary RFIC 310A and the second secondary RFIC may be the secondary RFIC 310C. In other cases, the secondary RFIC may be associated with a different primary RFIC from the first secondary RFIC. For example, the first secondary RFIC may be the secondary RFIC 310A, which is associated with the primary RFIC 308A, and the second secondary RFIC may be the secondary RFIC 310G, which is associated with the primary RFIC 308B. In such a case, the secondary RFIC 310G may receive the control signal from the primary RFIC 308B.

Similarly, in some cases, beam settings may be utilized for transmission of RF signals. The first secondary RFIC may receive a second RF signal from the primary RFIC and transmit the second RF signal to the device via the antenna elements of the first secondary RFIC based at least in part on a third beam setting. The primary RFIC may receive, from the baseband processor 304, a control signal that includes a fourth beam setting for transmitting the second RF signal through the second secondary RFIC, and may transmit the control signal (or portion thereof) to the second secondary RFIC. The second secondary RFIC may receive, from the primary RFIC, the control signal, receive the second RF signal from the primary RFIC, and transmit the second RF signal via the antenna elements of the second secondary RFIC based at least in part on the fourth beam setting. The primary RFIC may also transmit the control signal (or portion thereof) to the first secondary RFIC. In some cases, such as when the first secondary RFIC is not utilized in transmitting for the fourth beam setting, effectuating the control signal may cause the first secondary RFIC to power down a transmit path or enter a low power mode in response to receiving and processing the control signal.

Figure 8:
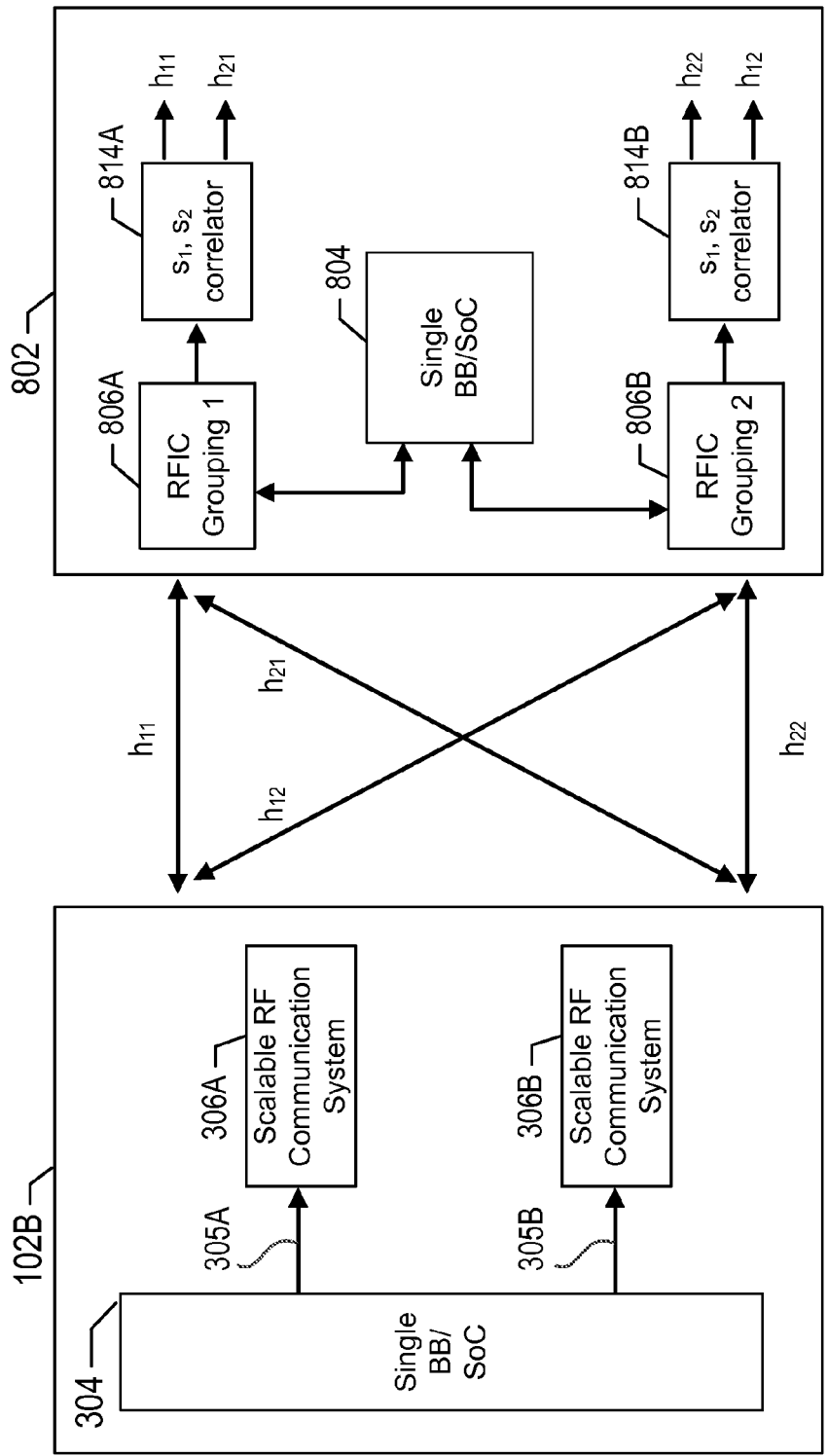
FIG. 8 illustrates beam training between devices in accordance with one or more implementations.

FIG. 8 illustrates beam training between the base station device 102B and a device 802 in accordance with one or more implementations. The device 802 may be another base station device (e.g., the base station device 102C) or a user device (e.g., the user device 104C). Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In one or more implementations, beam training may be facilitated (e.g., made faster) by parallelizing aspects of the beam training procedure. The beam training may be utilized by a transmitter and a receiver to find one or more beams (e.g., one or more beam settings) for use in communications between the transmitter and the receiver. For instance, the beam training may be utilized to find beam settings, which may include settings for the phase shifters and/or amplifiers to produce the beams that allow high quality communication between the transmitter and the receiver. High quality communication may be associated with, for example, higher SNR and/or lower number of iterations associated with decoding of LDPC codes. The beam training may be utilized to find multiple candidate beams, such that when a beam utilized for communication and originally associated with a highest quality decreases in quality, the transmitter may transition to another beam and utilize the other beam for communication. The quality of communication associated with a beam may change when the receiver has moved and/or the channel has changed (e.g., an obstruction has been introduced in the channel between the transmitter and the receiver). The beam settings of the candidate beams may be stored by the base station device 102B and/or the device 802.

In some cases, the beam training may utilize signals with zero or small correlation, but strong auto-correlation. Such signals may be transmitted simultaneously out of multiple antenna elements (e.g., out of secondary RFICs in different sectors), and the superposition may be measured by receive antenna elements. In some cases, the beam training may be faster by a factor directly proportional to the number of orthogonal or near-orthogonal signals utilized in the beam training procedure.

The device 802 includes a baseband processor 804, a RFIC grouping 806A, and a RFIC grouping 806B. In some cases, one or both of the RFIC groupings 806A-B may be, may include, or may be a part of, a scalable RF communication system (e.g., the scalable RF communication system 206). In some cases, the RFIC groupings 806A-B each includes a primary RFIC. In other cases, the RFIC groupings 806A-B may share a primary RFIC. The RFIC groupings 806A-B may each include a respective set of secondary RFICs. The RFIC groupings 806A-B may be coupled to correlators 814A-B. In some cases, the RFIC grouping 806A may include the correlator 814A and/or the RFIC grouping 806B may include the correlator 814B. The terms $h_{11}$, $h_{12}$, $h_{21}$, and $h_{22}$ may represent channel coefficients. For example, the term $h_{11}$ may be the channel coefficient associated with a communication channel (e.g., a wireless communication channel) between the scalable radio frequency communication system 306A and the RFIC grouping 806A.

In one or more implementations, antenna elements (not shown in FIG. 8) of the scalable RF communication systems 306A-B may be utilized to transmit a sequence. The antenna elements of the scalable RF communication system 306A may be utilized to transmit a sequence $s_1$, and the antenna elements of the scalable RF communication system 306A may be utilized to transmit a sequence $s_2$. In some cases, the sequences $s_1$ and $s_2$ are orthogonal or near-orthogonal. The sequence may be a Golay sequence, a Gold sequence, among others. In some cases, the transmission of the sequences may be performed at the same, or nearly the same, time.

To determine candidate beams for use in transmission by the base station device 102B to the device 802. The baseband processor 304 may transmit, over the transmission media 305A, the sequence $s_1$ to the scalable RF communication system 306A. The baseband processor 304 may transmit, over the transmission media 305B, the sequence $s_2$ to the scalable RF communication system 306B. The scalable RF communication systems 306A-B perform upconversion and beamforming (e.g., phase shifting), among other operations, on their respective sequence $s_1$ and $s_2$ and transmit the resulting RF signals to the device 802. In some cases, the transmissions are performed at the same, or nearly the same, time.

The device 802 may receive the transmissions from the base station device 102B. The orthogonality or near-orthogonality of the transmitted RF signals may allow the device 802 to differentiate between the two sequences. The sequence $s_1$ may be considered a signature of the scalable RF communication system 306A and the sequence $s_2$ may be considered a signature of the scalable RF communication system 306B. The RF signals received by the RFIC groupings 806A-B may be provided to the correlators 814A-B to determine power level and/or phase associated with the RF signals, which in turn may be utilized to determine the terms $h_{11}$, $h_{12}$, $h_{21}$, and $h_{22}$. Thus, the parallelization of transmitting the two sequences allows the terms $h_{11}$, $h_{12}$, $h_{21}$, and $h_{22}$ to be determined faster than in a case where only one sequence is transmitted at a time.

Without parallelization, the determination of the terms may be slower. In such a case, a sequence may be transmitted by the scalable RF communication system 306A while the scalable RF communication system 306B is not transmitting, from which the device 802 may determine the $h_{11}$ and $h_{12}$ terms. Then, a sequence may be transmitted by the scalable RF communication system 306B while the scalable RF communication system 306A is not transmitting, from which the device 802 may determine the $h_{22}$ and $h_{21}$ terms. In such a case, the sequence utilized by the scalable radio frequency communication systems 306A-B may be the same, or may be different, from each other. Furthermore, without parallelization, one of the scalable RF communication system 306A-B may be idle (e.g., not transmitting), which may reduce throughput relative to a case with parallelization.

In some cases, each of the scalable RF communication systems 306A-B may be associated with one or multiple RFIC groupings. Each of the RFIC groupings may be associated with a different sequence, where the sequences transmitted by the RFIC groupings are orthogonal or near-orthogonal with one another. Although in FIG. 8 the number of scalable RF systems of the base station device 102B is the same as the number of RFIC groupings of the device 802, the number of scalable RF communication systems and the number of RFIC groupings need not be the same. The number of sequences utilized may be equal to the number of RFIC groupings and/or scalable RF communication systems utilized by a transmitter of the sequences. In some cases, beam training may be performed for a scalable RF communication system that is associated with one or multiple RFIC groupings. The sequences may be transmitted at the same, or at nearly the same, time.

Figure 9:
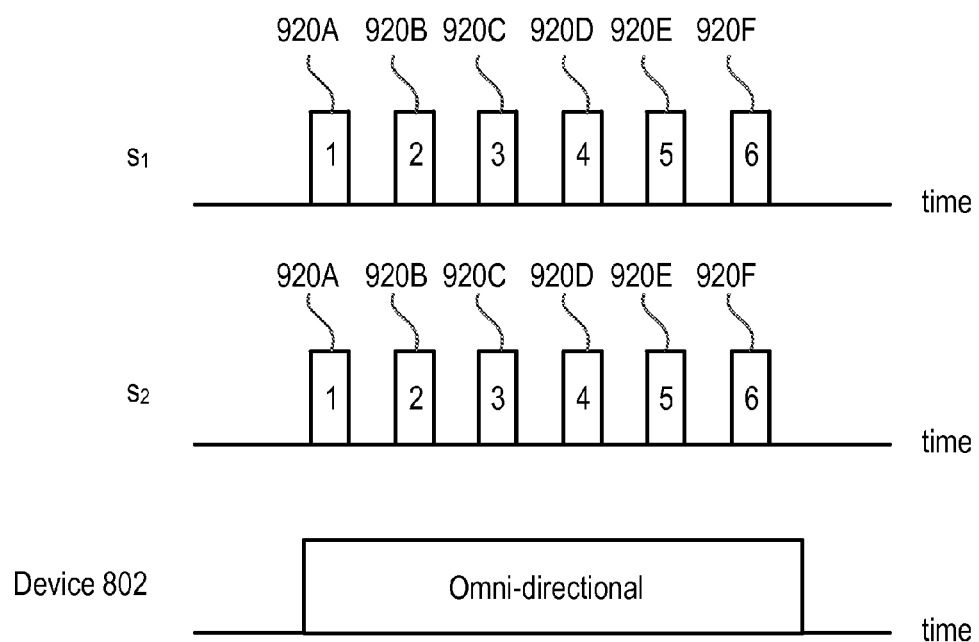
FIG. 9 illustrates beams of different beam settings transmitted from one device to another device in accordance with one or more implementations.

FIG. 9 illustrates beams of different beam settings transmitted from the base station device 102B to the device 802 in accordance with one or more implementations. In one or more implementations, the base station device 102B may be transmitting beams 920A-F (e.g., RF signals) generated from the sequences $s_1$ and $s_2$ using different beam settings (e.g., beamforming settings) over time. The sequences $s_1$ and $s_2$ may be transmitted by the scalable RF communication systems 306A and 306B, respectively. The beam settings may include, for example, factors such as direction (e.g., rotation) and/or amplitude of the beam. In FIG. 9, the number within the beams 920A-F is an identifier of the associated beam setting and is used for explanatory purposes.

The device 802 may be listening for the beams in an omni-directional manner, such that the beams 920A-F of all beam settings may be sensed. After receiving the beams, the device 802 may provide feedback to the base station device 102B indicating which of the beam settings are associated with higher quality beams. Higher quality beams may be associated with higher SNR. For example, the beam setting 2 may yield desirable results when sending the sequence $s_1$ and the beam setting 5 may yield desirable results when sending the sequence $s_2$. The beam settings 2 and 5 may be considered candidate beam settings for generating beams for transmission from the base station device 102B to the device 802. In some cases, different beam settings may be associated with different RFIC groupings. For example, the baseband processor 304 may utilize different RFIC groupings for communication in different directions. For instance, the beam setting 2 may be utilized for transmission by the scalable RF communication system 306A when communicating with the device 802 whereas the beam setting 5 may be utilized for transmission by the scalable RF system 306B when communicating with the device 802.

In some cases, alternative to or in addition to using orthogonal or near-orthogonal codes, the scalable RF communication systems 306A-B may each transmit at a different frequency. In such cases, the codes may not be orthogonal codes or near orthogonal codes. The device 802 may differentiate the transmissions from the scalable RF communication systems 306A-B based on the frequency associated with the transmissions, such as in a frequency division multiple access (FDMA) scheme. One or more beam settings may be selected for each of the scalable RF communication systems 306A-B.

In one or more implementations, in a case of link level failure, beam recovery may be facilitated (e.g., made faster) when one or multiple beams are applied in parallel to different blocks of data in a packet or to successive packets. Link level failure may be associated with packet loss. Recovery and/or code rate adaptation may be performed at the media access control (MAC) level and/or other higher levels. However, performing these operations at the MAC level and/or other higher levels may incur significant latency. The application of one or multiple beams may be utilized to perform beam recovery and, if beam recovery is successful, avoid use of the MAC layer and/or higher level protocols.

For explanatory purposes, the packet includes one or more LDPC codewords. If the LDPC codeword convergence time starts to increase, e.g. the number of iterations prior to convergence starts to increase, the link (e.g., the beam) that is utilized for the communication may be determined to be starting to fail. A beam may start to fail if a recipient of the packets moves and/or an obstruction is introduced in the channel. Once the failure (e.g., onset of failure) is detected, beam recovery (or beam searching) may be employed to determine a new beam for use in the communication. For explanatory purposes, the transmissions are between the base station device 102B and the device 802.

Figure 10:
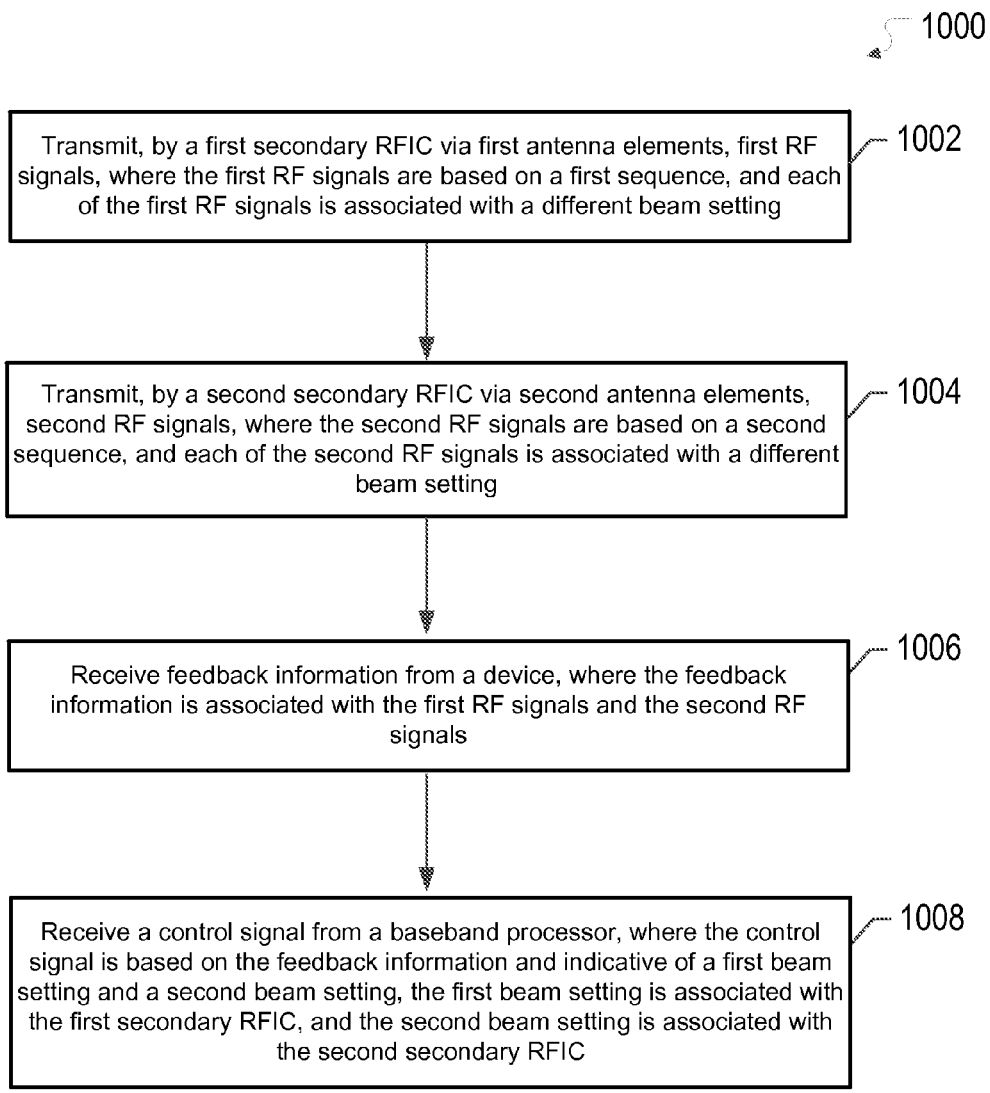
FIG. 10 illustrates a flow diagram of an example process for facilitating beam training in accordance with one or more implementations.

FIG. 10 illustrates a flow diagram of an example process 1000 for facilitating beam training in accordance with one or more implementations. For explanatory purposes, the example process 1000 is described herein with reference to the base station device 102B of FIGS. 3 and 8 and the device 802 of FIG. 8; however, the example process 1000 is not limited to the base station device 102B of FIGS. 3 and 8 and the device 802 of FIG. 8. Further for explanatory purposes, the blocks of the example process 1000 are described herein as occurring in serial, or linearly. However, multiple blocks of the example process 1000 may occur in parallel. In addition, the blocks of the example process 1000 need not be performed in the order shown and/or one or more of the blocks of the example process 1000 need not be performed.

A first secondary RFIC (e.g., the secondary RFIC 310A) transmits via its antenna elements first RF signals (1002). The first RF signals may be based on a first sequence $s_1$. Each of the first RF signals may be associated with a different beam setting. A second secondary RFIC transmits via its antenna elements second RF signals (1004). The second RF signals may be based on a second sequence $s_2$. Each of the second RF signals may be associated with a different beam setting. The sequences $s_1$ and $s_2$ may be orthogonal or near-orthogonal in some implementations. In some cases, the second secondary RFIC may be associated with (e.g., directly coupled to) the same primary RFIC (e.g., the primary RFIC 308A) as the first secondary RFIC. In other cases, the second secondary RFIC may be associated with a different primary RFIC from the first secondary RFIC. For example, the second secondary RFIC may be the secondary RFIC 310E, which is associated with the primary RFIC 308B. In some cases, a time duration in which the first RF signals are transmitted may overlap a time duration in which the second RF signals are transmitted.

Feedback information may be received from a device (1006), for example a device that received one or more of the first and/or second RF signals. The feedback information may be received by the baseband processor 304 through one or more of the primary RFICs 308A-B and/or one or more of the secondary RFICs 310A-G. The feedback information may be provided in an RF signal and may include information indicative of a quality of the beams received by the device, where the beams are associated with the beam settings utilized for transmitting the first and/or second RF signals. The first and second secondary RFICs receive one or more control signals from the baseband processor 304 (1008). The control signals may be generated by the baseband processor 304 based on the feedback information. The control signals may be indicative of a first beam setting (e.g., to be utilized by the first secondary RFIC) and a second beam setting (e.g., to be utilized by the second secondary RFIC). The first secondary RFIC may generate a third RF signal based on the first beam setting and transmit the third RF signal (e.g., to the device). The second secondary RFIC may generate a fourth RF signal based on the second beam setting and transmit the fourth RF signal (e.g., to the device).

Figure 11A:
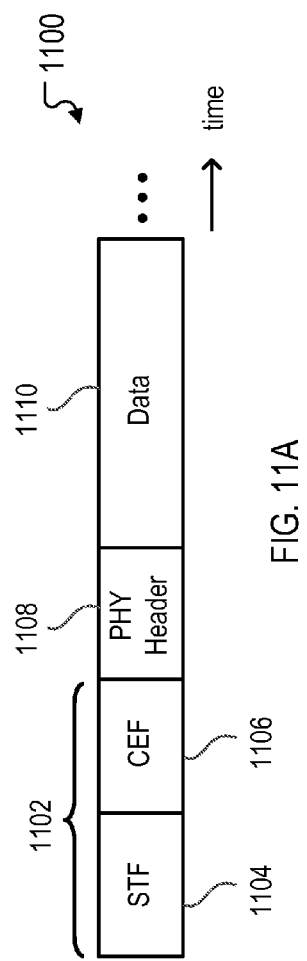
FIG. 11A illustrates an example packet.

FIG. 11A illustrates an example packet 1100. For explanatory purposes, the packet 1100 is illustrated as an 802.11ad packet. However, the implementations of the subject technology may be utilized with other packets, such as 802.11aj packets, 802.11ay packets, and packets of other wireless standards. The packet 1100 includes a preamble 1102, PHY header 1108, and data field 1110. The preamble 1102 includes a short training field (STF) 1104 and a channel estimation field (CEF) 1106. The STF 1104 may be utilized for packet detection, AGC, and frequency-offset (FO) correction. The CEF 1106 may be utilized for channel estimation. In some cases, the CEF 1106 may indicate a modulation to be utilized for the packet 1100. For example, the modulation may include a single carrier (SC) modulation or a multi-carrier modulation, e.g. orthogonal frequency division multiplexing (OFDM). The PHY header 1108 may contain information associated with the data field 1110. For example, the PHY header 1108 may include a length (e.g., number of data bits or data octets) of the data field 1110. The data field 1110 may be referred to as the payload field, payload, or data. The packet 1100 may include additional fields and/or subfields not explicitly shown in FIG. 11A, as represented by the ellipses.

Figure 11B:
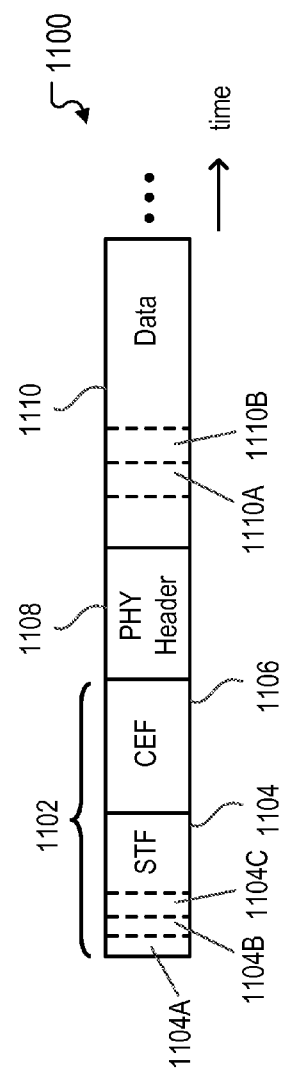
FIGS. 11B-C illustrate example segmentations of the packet of FIG. 11A.
Figure 11C:
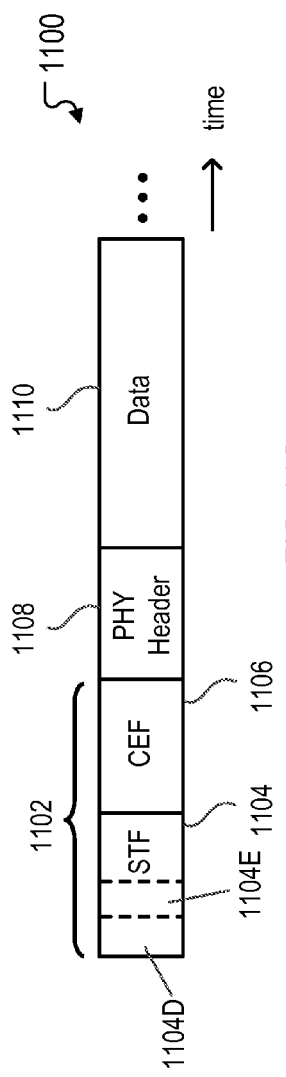

In one or more implementations, to facilitate beam recovery, the base station device 102B may transmit the packet 1100 (e.g., 802.11ad packet). The packet 1100 may be segmented into one or more transmission blocks. FIGS. 11B-C illustrate example segmentations of the packet 1100 of FIG. 11A into multiple transmission blocks in accordance with one or more implementations. In FIG. 11B, the STF 1104 includes at least transmission blocks 1104A-C and the data field 1110 includes at least transmission blocks 1110D-E. In FIG. 11C, the STF 1104 includes at least transmission blocks 1104D-E. Although five transmission blocks and two transmission blocks are depicted and labeled in FIG. 11B and FIG. 11C, respectively, the packet 1100 may be segmented into fewer, additional, and/or different transmission blocks. For example, the CEF 1106, PHY header 1108, the remainder of the data field 1110, the remainder of the STF 1104, and/or any other fields or subfields not explicitly shown in FIGS. 11A-C may be segmented into multiple transmission blocks.

In one or more implementations, within the packet 1100, multiple beams of different beam settings may be utilized to transmit the packet 1100. In some cases, any two transmission blocks of the packet 1100 may be associated with the same or different beam settings. In some cases, alternatively or in addition, beams of different beam settings may be utilized for transmitting a same part of the packet 1100. For example, in FIG. 11B and FIG. 11C, the transmission blocks 1104A and 1104D, respectively, among other transmission blocks, are shown as overlapping. FIG. 11B may show an example segmentation in which at least the transmission block 1104A is transmitted using one beam setting (e.g., beam setting 1), whereas FIG. 11C may show an example segmentation in which at least the transmission block 1104D is transmitted using another beam setting (e.g., beam setting 5). A boundary between any two transmission blocks is where a switch in the beam setting utilized by the base station device 102B occurs. In some cases, the switch time from using one beam (e.g., one beam setting) to using another beam (e.g., another beam setting) may be on the order of nanoseconds.

In some cases, boundaries between transmission blocks may coincide with other boundaries. For example, a boundary between two transmission block may be an end of a transmission of one OFDM symbol and an onset of a transmission of a neighboring OFDM symbol. In some cases, boundaries between transmission blocks may be arbitrary (e.g., does not coincide with boundaries of OFDM symbols, LDPC codewords, etc.). For example, a transmission block may include an end portion of one field (e.g., the STF 1104) and a beginning portion of another field (e.g., the CEF 1106). By way of non-limiting example, the transmission block may be, for example, an LDPC codeword, a portion (e.g., half, quarter) of an LDPC codeword, a packet, a subpacket (e.g., portion of a packet), an OFDM symbol, or any segmenting of the packet 1100 known and/or agreed upon between a transmitter (e.g., the base station device 102B) of the packet 1100 and a receiver (e.g., the device 802) of the packet 1100. Any two of the transmission blocks may be of the same length or different length.

In some cases, the STF 1104 may be transmitted using multiple beams of different beam settings, either at the same time and/or one beam after another. For example, the transmission block 1104A may be transmitted using a beam of beam setting 1, the transmission block 1104B may be transmitted using a beam of beam setting 5, and the transmission block 1104C may be transmitted using a beam of beam setting 1. In some cases, while the transmission block 1104A is being transmitted, the transmission block 1104D may be transmitted at the same time, using for example a beam of beam setting 5. Although the foregoing describes using beams of beam settings 1 and 5 for explanatory purposes, more than two different beam settings and/or beams of other beam settings may also be utilized in the transmission of the transmission blocks 1104A-D. Similarly, in some cases, the CEF 1106, PHY header 1108, data field 1110, and/or other fields and/or subfields may be segmented into one or more transmission blocks and transmitted using multiple beams of different beam settings, either at the same time and/or one beam after another. For example, the CEF 1106 may be segmented into at least a first transmission block and a second transmission block. The first transmission block may be transmitted using beams of beam setting 2 and the second transmission block may be transmitted using beams of beam setting 5.

In regard to transmission of the packet 1100 by the base station device 102B, the beam setting(s), transmitting blocks (and/or transmission block boundaries), and the beam setting(s) (and/or beam setting switching) to be applied by the base station device 102B for each transmitting block may be referred to as a beam switching pattern. To facilitate beam recovery, a signaling (e.g., synchronization) procedure may be performed by the base station device 102B and the device 802 to allow the base station device 102B to provide the beam switching pattern to the device 802. For example, the boundaries between any two transmission blocks and/or the beam switching to be effectuated at these boundaries may be provided by the base station device 102B to the device 802. In some cases, some parts of the beam switching pattern may be indicated in the PHY header 1108. For example, the PHY header 1108 may include the beam switching pattern associated with the data field 1110 and/or subsequent fields or subfields of the packet 1100. In some cases, the beam switching pattern or some parts thereof may be communicated through separate packets (e.g., prior to transmission of packets containing user payload). The beam switching pattern may be communicated between the base station device 102B and the device 802 using one or more of the above mechanisms (e.g., signaling procedure, using PHY header 1108, etc.).

The device 802, which is a receiver of the packet 1100, may determine a listening pattern based on the information provided by the base station device 102B. For example, to receive the transmission blocks of the packet 1100, the device 802 may configure itself (e.g., utilize different sets of antenna elements) to facilitate focusing of beams of different beam settings in accordance with the switching pattern.

The device 802 may make measurements (e.g., power measurements) of the transmission blocks to determine a quality of a given beam setting. In some cases, when LDPC codewords are utilized in the encoding of the packet 1100, the number of iterations needed by an LDPC decoder of the device 802 to decode the LDPC codewords may provide an indication of quality of a given beam setting. For example, if beam setting 1 is utilized to transmit the transmission block 1110A and beam setting 5 is utilized to transmit the transmission block 1110B, the beam setting that is associated with a lower number of iterations prior to convergence may be associated with a higher quality. The device 802 may generate and transmit feedback information regarding the quality associated with the various beam settings to the base station device 102B. For example, the feedback information may be, or may be derived from, the power measurements and/or the number of iterations associated with decoding the LDPC codewords. The feedback information may be utilized by the base station device 102B to adjust its switching pattern if needed. Any changes to the switching pattern may be signaled to the device 802.

In some cases, signaling may be utilized such that the device 802 is made aware of which parts of the LDPC codewords are carried in which portions of the packet 1100. In some cases, the signaling may also indicate that even numbered LDPC codes are transmitted using a certain beam setting (e.g., beam setting 1) and odd numbered LDPC codes are transmitted using another beam setting (e.g., beam setting 2).

As an example, the data field 1110 includes LDPC codewords. A beam setting may be utilized to transmit part of an LDPC codeword. For example, a first LDPC codeword may be of length 672. The transmission block 1110A may be transmitted using beam setting 1 and may include half of the first LDPC codeword, whereas the transmission block 1110B may be transmitted using beam setting 5 and may include the other half of the first LDPC codeword. For example, the first LDPC codeword may be carried by OFDM symbols, where each OFDM symbol may carry a portion of the first LDPC codeword. The transmission blocks 1110A-B may each include some OFDM symbols associated with the first LDPC codeword. The remainder of the transmission block 1110A may include a part of a second codeword. The remainder of the transmission block 1110B may include another part of the second codeword, or a part of a codeword different from the second codeword. The different codewords may be interleaved within the transmission blocks 1110A-B. In some cases, the transmission blocks 1110A and/or 1110B may include parts of more than two LDPC codewords.

With knowledge of which parts of which LDPC codewords are in which transmission blocks, the transmission of the transmission blocks (e.g., the transmission blocks 1110A-B) using beams of different beam settings may facilitate correction of any errors by the device 802 when receiving the transmission blocks. For example, in a case where two beams are used, the odd numbered transmission blocks may use a beam of beam setting 1 whereas the even numbered transmission blocks may use a beam of beam setting 5. Errors (e.g., systemic errors) in the odd transmission blocks, such as due to damage in components associated with the transmission and/or receipt of beams of beam setting 1, may be correctable by the transmission blocks transmitted using beam setting 5. In this regard, an LDPC codeword spread across both odd and even transmission blocks may be pieced together based at least on the even transmission blocks. In some cases, the device 802 may indicate the presence of errors in the odd transmission blocks in the feedback information to the base station device 102B. The base station device 102B may use the feedback information to change its switching pattern and/or fix the components of the base station device 102B associated with beam setting 1.

Although the foregoing description is described with respect to beam recovery for the base station device 102B, in one or more implementations, packets, including those with the format of the packet 1100, may be transmitted during normal transmission operation of the base station device 102B. The base station device 102B may utilize a beam switching pattern (e.g., signaled to the device 802) to transmit the transmission blocks of the packets. The device 802 may provide feedback information regarding the various beam settings utilized in the transmission of the transmission blocks of the packets. The base station device 102B may utilize the feedback information to facilitate the maintaining/monitoring of good links (e.g., beams), such as usable links.

In one or more implementations, beam transmission and beam recovery may be performed with little or no interruption to data transmission, since the testing and applying of the multiple beam settings may occur together with transmission of the data field (e.g., the data field 1110) of the packets. In this regard, in one or more implementations, beamforming is performed on actual data bits, rather than beamforming overhead bits included in the packets. In some cases, error correction may be performed on packets transmitted using multiple different beams to allow recovery of the packets.

Thus, in some cases, the testing and applying of multiple beams within a packet may be utilized prior to an onset of failure (e.g., during normal transmission operation). For example, different beam settings may be tested in advance of failure, such that when a start of failure is detected, a switch to another of the beam settings and/or an adjustment of the beam switching pattern may be performed. At the onset of failure of one or more beams, the base station device 102B may switch to other beams tested and applied during the normal transmission operation, e.g. other beams that are associated with higher quality than the failing beams. In some cases, alternative to or in addition to switching to another beam setting, when a possible link failure is detected, the code rate may be reduced rather than changing beams (e.g., changing to another beam setting).

Figure 12:
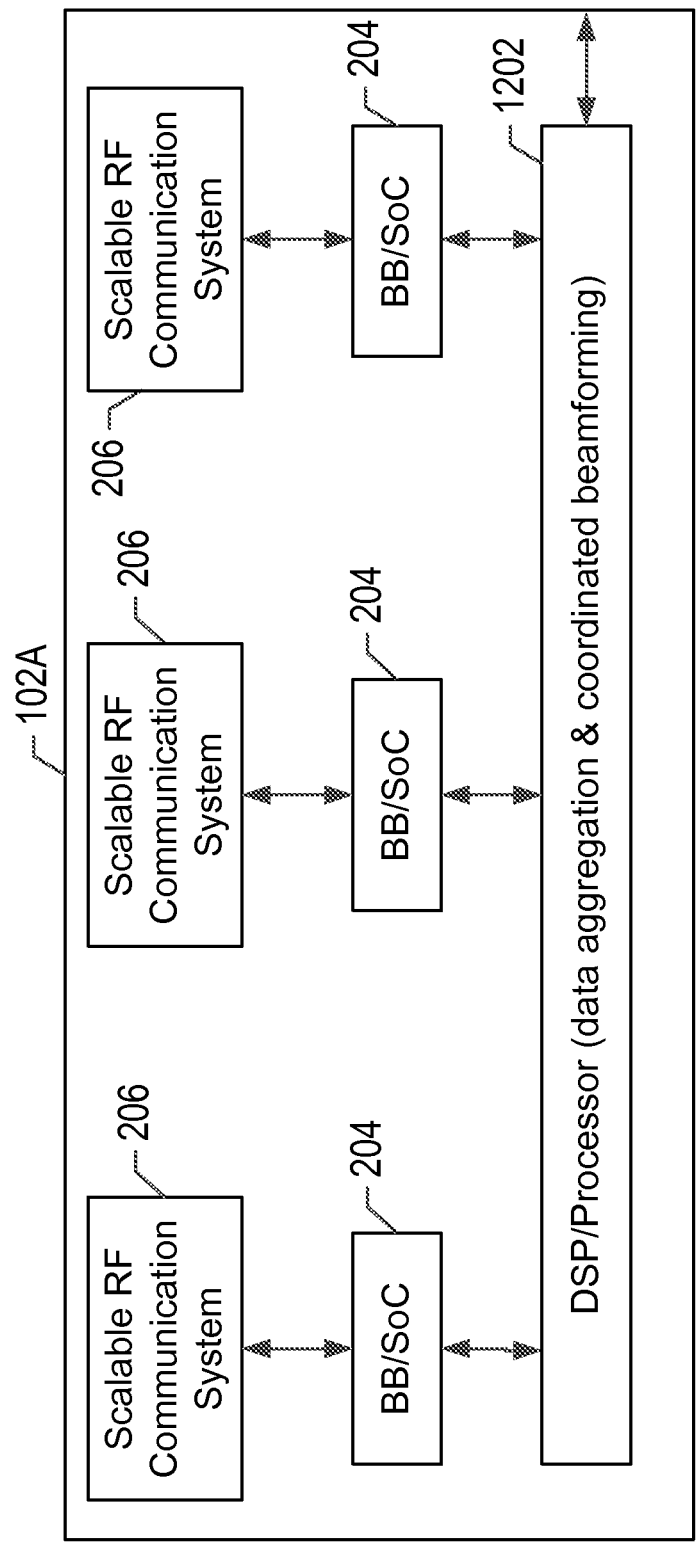
FIG. 12 illustrates an example base station device implementing multiple scalable radio frequency communication systems in accordance with one or more implementations.

FIG. 12 illustrates an example base station device 102A implementing multiple scalable radio frequency communication systems 206 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The base station device 102A includes multiple scalable RF communication systems 206, each of which is coupled to a baseband processor 204. Each of the scalable RF communication systems 206 may be the scalable RF communication system 206 discussed above with respect to FIG. 2, or a variation thereof. The baseband processors 204 are each coupled to digital signal processor (DSP) 1202. The DSP 1202 performs data aggregation and coordinates beamforming amongst the scalable RF communication systems. The DSP 1202 may transmit control information, such as phase shifting information, and/or data signals to each of the baseband processors 204. The baseband processors 204 transmit the control information and/or data signals to the respective primary RFICs 208, and the primary RFICs 208 propagate the control information and/or data signals to the secondary RFICs 210A-E.

In one or more implementations, one or more of the scalable RF communication systems 206, the baseband processors 204, the DSP 1202, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 13:
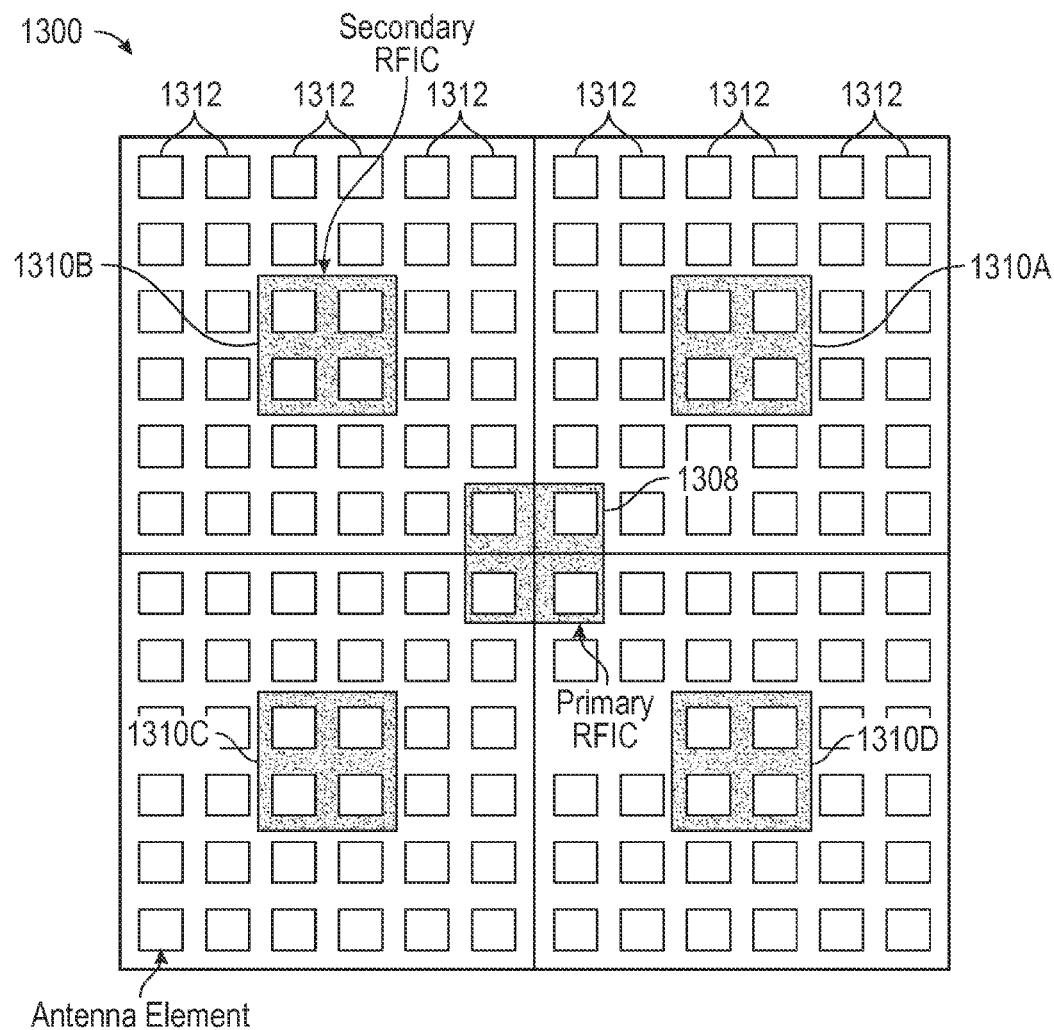
FIG. 13 illustrates an example layout of a scalable radio frequency communication system in accordance with one or more implementations.

FIG. 13 illustrates an example layout 1300 of a scalable RF communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The layout 1300 includes a primary RFIC 1308 and multiple secondary RFICs 1310A-D. Each of the secondary RFICs 1310A-D is coupled to a number of antenna elements 1312. For explanatory purposes, only one row of the antenna elements 1312 is labeled in FIG. 13; however, each of the squares surrounding/overlapping the RFICs 1310A-D represents antenna elements. The relative proximity of the secondary RFICs 1310A-D to the primary RFIC 1308 may facilitate transmitting the RF signals between the primary RFIC 1308 and the secondary RFICs 1310A-D.

Figure 14:
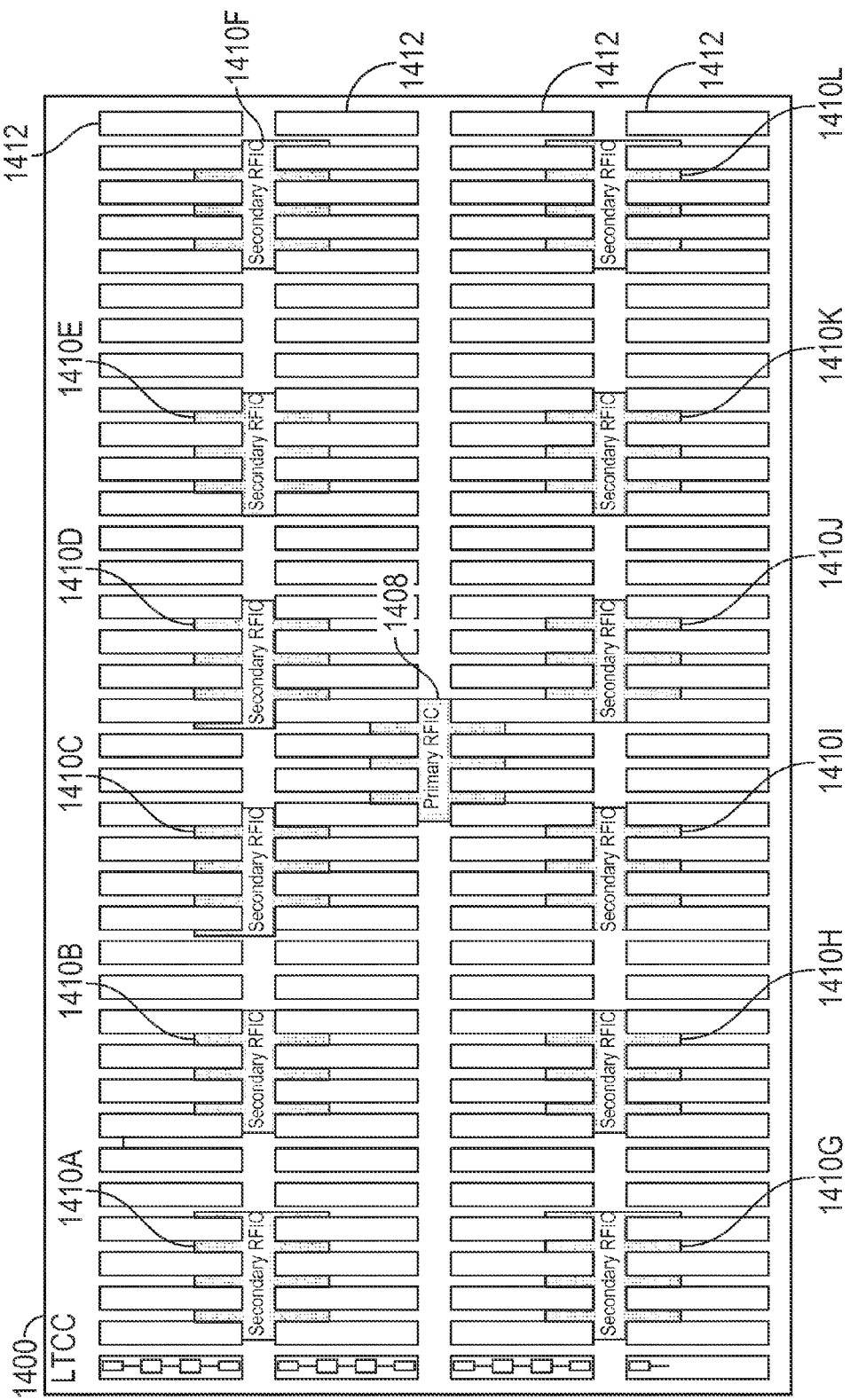
FIG. 14 illustrates an example substrate of a scalable radio frequency communication system in accordance with one or more implementations.

FIG. 14 illustrates an example substrate 1400 of a scalable RF communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The substrate 1400 may be, for example, a ceramic substrate, such as a low temperature co-fired ceramic (LTCC) substrate, a silicon substrate, or generally any substrate. The substrate 1400 includes a primary RFIC 1408, secondary RFICs 1410A-L and subarrays of antenna elements 1412. The primary RFIC 1408 and the secondary RFICs 1410A-L may be attached to a first surface of the substrate 1400. The subarrays of antenna elements 1412 are then attached to the first surface of the substrate 1400 and/or a first surface of the RFICs 1408, 1410A-L. For explanatory purposes, only a single column of the subarrays of antenna elements 1412 is labeled in FIG. 14; however, each of the rectangles in FIG. 14 represents one of the subarrays of antenna elements 1412.

In FIG. 14, the twelve secondary RFICs 1410A-L may each include twelve RF transmit/receive (Tx/Rx) ports for a total of 144 ports. Each of the Tx/Rx ports may drive one of the subarrays of antenna elements 1412, such as a 1×4 subarray which consists of a four element vertical linear array of printed radiators (patches). Thus, in this instance there may be 576 antenna elements over the substrate 1400.

The array aperture in FIG. 14 may be approximately 50 millimeters by 85 millimeters with the 576 elements breaking down, in one example, to 36 by 16. The azimuth plane may scan to +/−60 degrees while the elevation plane may have a limited scan of +/−3 degrees. The single element gain may be 3 dBi. When the substrate 1400 is LTCC, the loss of the LTCC may be 1 dB/cm. Wafer Level Chip Scale Packaging (WLCSP) may be applied directly to the antenna substrate.

Thus, the integration of multiple RFICs 1408, 1410A-L may be performed at the package or board level. In package level integration, the dies are integrated within a single package such that each secondary RFIC 1410A-L is placed under the subarrays of antenna elements 1412 associated with each secondary RFIC 1410A-L to minimize the RF signal (e.g., 60 GHz) routing loss from the last stage of the power amplifiers to the subarrays of antenna elements 1412. In one or more implementations, multiple package RFICs (one as a primary RFIC 1408 and several secondary RFICs 1410A-L) may be used for integration at the board level to provide a highly directional antenna array.

Figure 15:
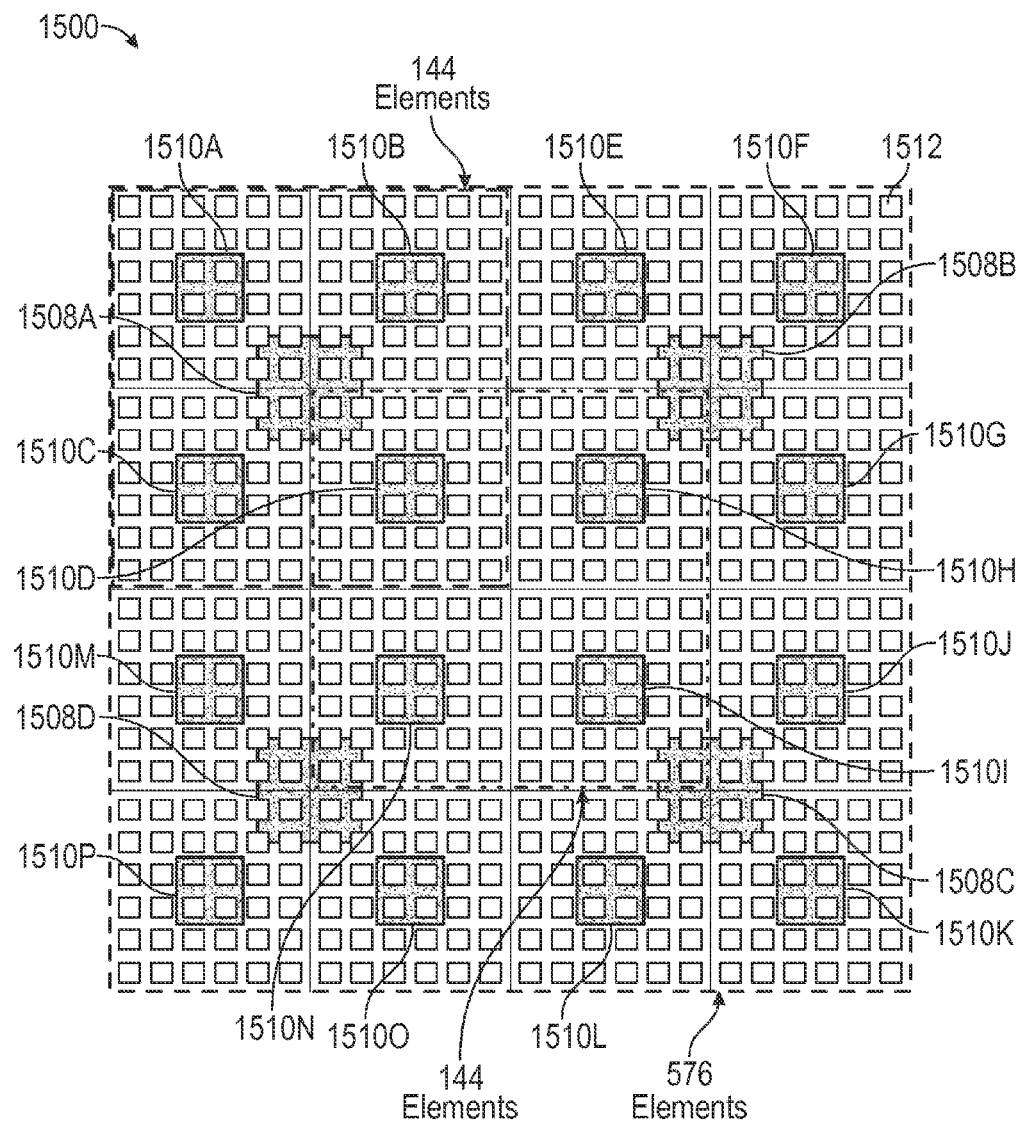
FIG. 15 illustrates an example layout of a multi-tier scalable radio frequency communication system in accordance with one or more implementations.

FIG. 15 illustrates an example layout 1500 of a multi-tier scalable radio frequency communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The layout 1500 includes multiple primary RFICs 1508A-D each of which is coupled to multiple secondary RFICs 1510A-P. Each of the secondary RFICs 1510A-P is coupled to a number of antenna elements 1512. For explanatory purposes, a single antenna element 1512 is labeled in FIG. 15; however, each of the squares in FIG. 15 represents an antenna element 1512. Similar to the multiple scalable RF communication systems 206 of FIG. 12, each of the primary RFICs 1508A-D may be coupled to separate baseband processors 204 and each of the baseband processors 204 may be coupled to a DSP 1202. The DSP 1202 may perform data aggregation and may coordinate beamforming across all of the primary RFICs 1508A-D.

Figure 16:
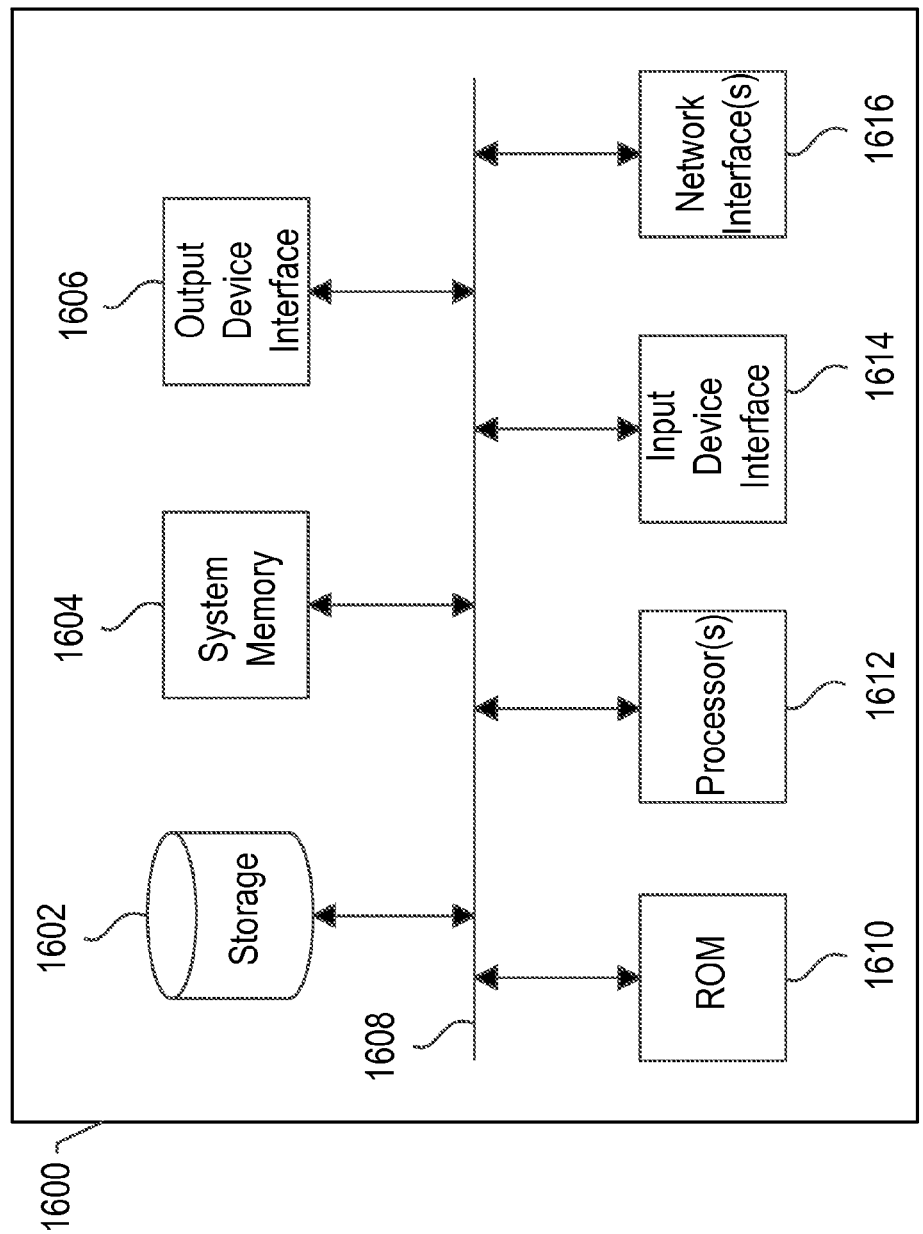
FIG. 16 conceptually illustrates an electronic system with which one or more implementations of the subject technology may be implemented.

FIG. 16 conceptually illustrates an electronic system 1600 with which one or more implementations of the subject technology may be implemented. The electronic system 1600, for example, may be, or may be coupled to, a powertrain system, a chassis system, a telematics system, an entertainment system, a camera system, a sensor system, such as a lane departure system, a diagnostics system, a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 1600 can be, and/or can be a part of, one or more of the base station devices 102A-E and/or the user devices 104A-C. Such an electronic system includes various types of computer readable media and interfaces for various other types of computer readable media. The electronic system 1600 includes a bus 1608, one or more processor(s) 1612, a system memory 1604 or buffer, a read-only memory (ROM) 1610, a permanent storage device 1602, an input device interface 1614, an output device interface 1606, and one or more network interface(s) 1616, or subsets and variations thereof.

The bus 1608 collectively represents all system, peripheral, and chipset buses that communicatively connect the numerous internal devices of the electronic system 1600. In one or more implementations, the bus 1608 communicatively connects the one or more processor(s) 1612 with the ROM 1610, the system memory 1604, and the permanent storage device 1602. From these various memory units, the one or more processor(s) 1612 retrieve instructions to execute and data to process in order to execute the processes of the subject disclosure. The one or more processor(s) 1612 can be a single processor or a multi-core processor in different implementations.

The ROM 1610 stores static data and instructions that are needed by the one or more processor(s) 1612 and other modules of the electronic system 1600. The permanent storage device 1602, on the other hand, may be a read-and-write memory device. The permanent storage device 1602 may be a non-volatile memory unit that stores instructions and data even when the electronic system 1600 is off. In one or more implementations, a mass-storage device (such as a magnetic or optical disk and its corresponding disk drive) may be used as the permanent storage device 1602.

In one or more implementations, a removable storage device (such as a floppy disk, flash drive, and its corresponding disk drive) may be used as the permanent storage device 1602. Like the permanent storage device 1602, the system memory 1604 may be a read-and-write memory device. However, unlike the permanent storage device 1602, the system memory 1604 may be a volatile read-and-write memory, such as random access memory. The system memory 1604 may store any of the instructions and data that one or more processor(s) 1612 may need at runtime. In one or more implementations, the processes of the subject disclosure are stored in the system memory 1604, the permanent storage device 1602, and/or the ROM 1610. From these various memory units, the one or more processor(s) 1612 retrieve instructions to execute and data to process in order to execute the processes of one or more implementations.

The bus 1608 also connects to the input and output device interfaces 1614 and 1606. The input device interface 1614 enables a user to communicate information and select commands to the electronic system 1600. Input devices that may be used with the input device interface 1614 may include, for example, alphanumeric keyboards and pointing devices (also called "cursor control devices"). The output device interface 1606 may enable, for example, the display of images generated by the electronic system 1600. Output devices that may be used with the output device interface 1606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 16, the bus 1608 also couples the electronic system 1600 to one or more networks (not shown) through one or more network interface(s) 1616. One or more network interface(s) may include an Ethernet interface, a WiFi interface, a cellular interface, a mmWave interface, a reduced gigabit media independent interface (RGMII), or generally any interface for connecting to a network. The one or more network interfaces 1616 may include, or may be coupled to, a physical layer module. In this manner, the electronic system 1600 can be a part of one or more networks of computers (such as a local area network ("LAN"), a wide area network ("WAN"), or an Intranet, or a network of networks, such as the Internet. Any or all components of the electronic system 1600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system comprising:
a first secondary radio frequency integrated circuit (RFIC) configured to receive a first radio frequency (RF) signal from a device via first antenna elements based at least in part on a first beam setting, and transmit the first RF signal to a first primary RFIC;
the first primary RFIC configured to:
receive the first RF signal from the first secondary RFIC;
downconvert the first RF signal to a first intermediate frequency (IF) signal and transmit the first IF signal to a baseband processor;
receive, from the baseband processor, a first control signal comprising a second beam setting for receiving the first RF signal through a second secondary RFIC; and
transmit the first control signal to the second secondary RFIC; and
the second secondary RFIC configured to receive the first control signal from the first primary RFIC, and receive the first RF signal from the device via second antenna elements based at least in part on the second beam setting.

2. The system of claim 1, wherein the first primary RFIC is further configured to:
transmit at least a portion of the first control signal to the first secondary RFIC; and
the first secondary RFIC is further configured to:
power down a receive path or enter a low power mode in response to receiving the at least the portion of the first control signal.

3. The system of claim 1, wherein the first control signal is indicative of one or more phase shifter settings of the second secondary RFIC, and the second secondary RFIC is further configured to:
adjust one or more phase shifters based at least in part on the one or more phase shifter settings.

4. The system of claim 1, wherein the first beam setting is provided to the first secondary RFIC by the baseband processor via the first primary RFIC.

5. The system of claim 1, wherein:
the first secondary RFIC is further configured to receive a second RF signal from the primary RFIC and transmit the second RF signal to the device via the first antenna elements based at least in part on a third beam setting;
the primary RFIC is further configured to receive, from the baseband processor, a second control signal comprising a fourth beam setting for transmitting the second RF signal through the second secondary RFIC, and transmit the second control signal to the second secondary RFICs; and
the second secondary RFIC is further configured to receive, from the primary RFIC, the second control signal, receive the second RF signal from the primary RFIC, and transmit the second RF signal via the second antenna elements based at least in part on the fourth beam setting.

6. The system of claim 5, wherein the first primary RFIC is further configured to:
transmit at least a portion of the second control signal to the first secondary RFIC; and
the first secondary RFIC is further configured to:
power down a transmit path or enter a low power mode in response to receiving the at least the portion of the second control signal.

7. The system of claim 1, wherein:
the first primary RFIC is further configured to:
receive a second control signal, the second control signal being indicative of a third beam setting;
receive a second IF signal from the baseband processor;
generate a second RF signal based at least in part on the second IF signal; and
transmit the second RF signal to the second secondary RFIC; and
the second secondary RFIC is further configured to:
generate a third RF signal based at least in part on the second RF signal and the third beam setting; and
transmit the third RF signal to the device.

8. The system of claim 1, wherein:
the first beam setting is associated with a first direction, and the second beam setting is associated with a second direction different from the first direction.

9. The system of claim 1, wherein the first secondary RFIC is further configured to:
transmit a packet to the device based on a beam switching pattern, the packet comprising at least a first transmission block and a second transmission block, by transmitting the first transmission block using a third beam setting and transmitting the second transmission block using a fourth beam setting.

10. The system of claim 9, wherein:
the first secondary RFIC is further configured to:
receive feedback information associated with the packet from the device;
transmit the feedback information to the baseband processor via the first primary RFIC; and
receive information indicative of adjustments to the beam switching pattern from the baseband processor.

11. The system of claim 1, wherein:
the first control signal is based on detection of a movement of the device, and the detection is based on the first RF signal received from the device by the first secondary RFIC.

12. The system of claim 1, wherein the first control signal is based on a power level associated with the first RF signal received from the device by the first secondary RFIC.

13. A method comprising:
transmitting, by a first secondary radio frequency integrated circuit (RFIC) via first antenna elements, a first plurality of radio frequency (RF) signals, wherein the first plurality of RF signals is based on a first sequence, and each of the first plurality of RF signals is associated with a different beam setting among a plurality of beam settings;
transmitting, by a second secondary RFIC, a second plurality of RF signals via second antenna elements, wherein the second plurality of RF signals is based on a second sequence, and each of the second plurality of RF signals is associated with a different beam setting among the plurality of beam settings;
receiving feedback information from a device, wherein the feedback information is associated with the first plurality of RF signals and the second plurality of RF signals; and
receiving a control signal from a baseband processor, wherein the control signal is based on the feedback information and indicative of a first beam setting and a second beam setting, the first beam setting is associated with the first secondary RFIC, and the second beam setting is associated with the second secondary RFIC.

14. The method of claim 13, further comprising:
generating, by the first secondary RFIC, a third RF signal based on the first beam setting;
transmitting, by the first secondary RFIC, the third RF signal;
generating, by the second secondary RFIC, a fourth RF signal based on the second beam setting; and
transmitting, by the second secondary RFIC, the fourth RF signal.

15. The method of claim 13, wherein a time duration associated with transmitting the first plurality of RF signals overlaps with a time duration associated with transmitting the second plurality of RF signals.

16. The method of claim 13, further comprising:
receiving, by a primary RFIC, a first intermediate frequency (IF) signal from the baseband processor;
generating, by the primary RFIC, a third RF signal based on the first IF signal; and
transmitting, by the primary RFIC, the third RF signal to the first secondary RFIC and the second secondary RFIC, the first plurality of RF signals and the second plurality of RF signals being based on the third RF signal.

17. A computer program product comprising instructions stored in a non-transitory computer-readable storage medium, the instructions comprising:
instructions to receive a first radio frequency (RF) signal from a first secondary radio frequency integrated circuit (RFIC), the first RF signal having been received by the first secondary RFIC via first antenna elements from a device based at least in part on a first beam setting;
instructions to downconvert the first RF signal to a first intermediate frequency (IF) signal and transmit the first IF signal to a baseband processor;

instructions to receive, from the baseband processor, a first control signal comprising a second beam setting for receiving the first RF signal through a second secondary RFIC; and instructions to transmit the first control signal to the second secondary RFIC, the second secondary RFIC being configured to receive the first control signal and receive the first RF signal via second antenna elements from the device based at least in part on the second beam setting.

18. The computer program product of claim 17, wherein the instructions further comprise instructions to transmit at least a portion of the first control signal to the first secondary RFIC for causing the first secondary RFIC to power down a receive path or enter a low power mode in response to the at least the portion of the first control signal.

19. The computer program product of claim 17, wherein the first control signal is further indicative of one or more phase shifter settings of the second secondary RFIC.

20. The computer program product of claim 17, wherein the instructions further comprise:

instructions to transmit, to the first secondary RFIC, a second RF signal, the first secondary RFIC being configured to transmit the second RF signal based at least in part on a third beam setting;

instructions to receive, from the baseband processor, a second control signal comprising a fourth beam setting for transmitting the second RF signal through the second secondary RFIC; and instructions to transmit, to the second secondary RFIC, the second RF signal and at least a portion of the second control signal, the second secondary RFIC being configured to transmit the second RF signal based at least in part on the fourth beam setting.

* * * * *